United States Patent
Suzuki et al.

(10) Patent No.: US 10,080,237 B2
(45) Date of Patent: Sep. 18, 2018

(54) WIRELESS COMMUNICATION SYSTEM, BASE STATION APPARATUS, MOBILE STATION APPARATUS, AND WIRELESS COMMUNICATION METHOD

(71) Applicant: SHARP KABUSHIKI KAISHA, Sakai, Osaka (JP)

(72) Inventors: Shoichi Suzuki, Osaka (JP); Yasuyuki Kato, Osaka (JP); Shohei Yamada, Osaka (JP)

(73) Assignee: SHARP KABUSHIKI KAISHA, Sakai, Osaka (JP)

(*) Notice: Subject to any disclaimer, the term of this patent is extended or adjusted under 35 U.S.C. 154(b) by 0 days.

(21) Appl. No.: 15/472,005

(22) Filed: Mar. 28, 2017

(65) Prior Publication Data
US 2017/0202013 A1 Jul. 13, 2017

Related U.S. Application Data

(60) Continuation of application No. 14/965,622, filed on Dec. 10, 2015, now Pat. No. 9,655,142, which is a (Continued)

(30) Foreign Application Priority Data

Aug. 6, 2009 (JP) ................. 2009-183031

(51) Int. Cl.
*H04W 74/00* (2009.01)
*H04W 72/04* (2009.01)
*H04W 74/08* (2009.01)

(52) U.S. Cl.
CPC ....... *H04W 74/004* (2013.01); *H04W 72/042* (2013.01); *H04W 72/0453* (2013.01); *H04W 74/0833* (2013.01)

(58) Field of Classification Search
None
See application file for complete search history.

(56) References Cited

U.S. PATENT DOCUMENTS

| 7,983,215 B2* | 7/2011 | Choi | H04W 74/004 370/328 |
| 8,406,180 B2* | 3/2013 | Park | H04W 74/0866 370/329 |

(Continued)

FOREIGN PATENT DOCUMENTS

| WO | WO 2008/055235 A2 | 5/2008 |
| WO | WO 2009/041784 A2 | 4/2009 |

(Continued)

OTHER PUBLICATIONS

3rd Generation Partnership Project; Technical Specification Group Radio Access Network; Evolved Universal Terrestrial Radio Access (E-UTRA) Medium Access Control (MAC) protocol specification (Release 8), 3GPP TS 36.321 V8.5.0 (Mar. 2009).

(Continued)

*Primary Examiner* — Hong Cho
(74) *Attorney, Agent, or Firm* — Birch, Stewart, Kolasch & Birch, LLP

(57) ABSTRACT

A mobile station apparatus receives, on a PDCCH (physical downlink control channel), information used for initiating a random access procedure. The mobile station apparatus also transmits a random access preamble on a physical random access channel resource based on or in response to the information. Furthermore, the mobile station apparatus receives a random access response corresponding to the random access preamble on one specific downlink component carrier among a plurality of downlink component carriers where the one specific downlink component carrier linked to an uplink component carrier on which the random (Continued)

access preamble is transmitted on the physical random access channel resource.

8 Claims, 17 Drawing Sheets

Related U.S. Application Data continuation of application No. 14/599,152, filed on Jan. 16, 2015, which is a continuation of application No. 14/140,341, filed on Dec. 24, 2013, now Pat. No. 8,976,736, which is a division of application No. 13/366,075, filed on Feb. 3, 2012, now Pat. No. 8,644,222, which is a continuation of application No. PCT/JP2010/062953, filed on Jul. 30, 2010.

(56) References Cited

U.S. PATENT DOCUMENTS

| | | | | |
|---|---|---|---|---|
| 8,432,811 B2* | 4/2013 | Park | ......... | H04W 56/0005 370/236 |
| 8,437,759 B2* | 5/2013 | Jung | ......... | H04W 8/26 370/328 |
| 8,630,653 B2* | 1/2014 | Ahn | ......... | H04W 72/042 370/329 |
| 2009/0262680 A1* | 10/2009 | Choi | ......... | H04W 74/004 370/328 |
| 2009/0316593 A1* | 12/2009 | Wang | ......... | H04W 74/0833 370/252 |
| 2010/0067470 A1* | 3/2010 | Damnjanovic | ......... | H04L 5/0053 370/329 |
| 2010/0093386 A1 | 4/2010 | Damnjanovic et al. | | |
| 2010/0216479 A1 | 8/2010 | Kato et al. | | |
| 2010/0260079 A1 | 10/2010 | Baldemair et al. | | |
| 2010/0265854 A1 | 10/2010 | Baldemair et al. | | |
| 2010/0331003 A1* | 12/2010 | Park | ......... | H04W 74/0866 455/450 |
| 2011/0014922 A1* | 1/2011 | Jen | ......... | H04W 74/002 455/450 |
| 2011/0075629 A1* | 3/2011 | Seo | ......... | H04W 74/002 370/330 |
| 2011/0170499 A1* | 7/2011 | Nayeb Nazar | ......... | H04L 1/1812 370/329 |

FOREIGN PATENT DOCUMENTS

| | | |
|---|---|---|
| WO | WO 2009/054311 A1 | 4/2009 |
| WO | WO 2009/075632 A2 | 6/2009 |

OTHER PUBLICATIONS

3rd Generation Partnership Project; Technical Specification Group Radio Access Network; Evolved Universal Terrestrial Radion Access (E-UTRA) Medium Access Control (MAC) protocol specification (Release 8), 3GPP TS 36.321 V8.6.0 (Jun. 2009), pp. 1-44.
3rd Generation Partnership Project; Technical Specification Group Radio Access Network; Further Advancements for E-UTRA Physical Layer Aspects (Release 9), 3GPP TR 36.814 V1.0.2 (Mar. 2009).
Ericsson, "Dedicated Preamble Assignment", 3GPP TSG-RAN WG2 #63bis, R2-085260, Sep. 29-Oct. 3, 2008, Prague, Czech Republic, pp. 1-5.
International Preliminary Report on Patentablity, completed on Nov. 16, 2011, issued in PCT/JP2010/062953.
International Search Report dated Aug. 31, 2010, issued in PCT/JP2010/062953.
NTT Docomo, "Initial Access Procedure for Asymmetric Wider Bandwidth in LTE-Advanced", 3GPP TSG RAN WG1 Meeting #57bis, R1-092802, Los Angeles, USA, Jun. 29-Jul. 3, 2009, pp. 1-4.
Qualcomm Europe, "Multicarrier Control for LTE-Advanced", 3GPP TSG RAN WG1 #56bis, Mar. 23-27, 2009, Seoul, Korea, R1-091460, pp. 1-8.
U.S. Notice of Allowance issued in U.S. Appl. No. 13/366,075 dated Sep. 25, 2013.
U.S. Office Action issued in U.S. Appl. No. 13/366,075 dated Jun. 11, 2013.
Written Opinion of the International Searching Authority dated Aug. 31, 2010, issued in PCT/JP2010/062953.
ZTE, On DL Component Carrier Ambiguity in Initial Random Access Procedure, 3GPP TSG RAN WG2 Meeting #66bis, R2-094039/R1-092463, Los Angeles, USA, Jun. 29-Jul. 3, 2009, XP050352200, 8 pages.
3GPP, "3rd Generation Partnership Project; Technical Specification Group Radio Access Network; Evolved Universal Terrestrial Radio Access (E-UTRA) Medium Access Control (MAC) protocol specification (Release 8)," 3GPP TS 36.321 V8.6.0, Jun. 2009, pp. 1-47.
3GPP, "3rd Generation Partnership Project; Technical Specification Group Radio Access Network; Evolved Universal Terrestrial Radio Access (E-UTRA); Multiplexing and channel coding (Release 8)," 3GPP TS 36.212 V8.6.0, Mar. 2009, pp. 1-59.
NTT Docomo, "Initial Access Procedure for Asymmetric Wider Bandwidth in LTE-Advanced," 3GPP TSG RAN WG1 Meeting #57, San Francisco, USA, May 4-8, 2009, R1-092099 (Original R1-083680), pp. 1-5.
U.S. Notice of Allowance issued in U.S. Appl. No. 14/140,341 dated Oct. 22, 2014.
U.S. Notice of Allowance issued in U.S. Appl. No. 14/965,622 dated Jan. 9, 2017.
U.S. Office Action issued in U.S. Appl. No. 14/599,152 dated Sep. 21, 2015.
U.S. Office Action issued in U.S. Appl. No. 14/965,622 dated Sep. 26, 2017.

\* cited by examiner

WIRELESS COMMUNICATION SYSTEM, BASE STATION APPARATUS, MOBILE STATION APPARATUS, AND WIRELESS COMMUNICATION METHOD

This application is a continuation of U.S. application Ser. No. 14/965,622 filed Dec. 10, 2015, which is a continuation of U.S. application Ser. No. 14/599,152 filed Jan. 16, 2015, which is a continuation of U.S. application Ser. No. 14/140, 341, now U.S. Pat. No. 8,976,736, filed Dec. 24, 2013, which is a divisional of application Ser. No. 13/366,075, now U.S. Pat. No. 8,644,222, filed on Feb. 3, 2012, and for which priority is claimed under 35 U.S.C. § 120, application Ser. No. 13/366,075 is a bypass continuation of PCT International Application No. PCT/JP2010/062953 filed on Jul. 30, 2010, which claims the benefit of priority of JP2009-183031 filed Aug. 6, 2009. The entire contents of each of the above-identified applications are hereby incorporated by reference.

TECHNICAL FIELD

The present invention relates to a wireless communication system in which abase station apparatus communicates with a mobile station apparatus using a plurality of uplink carrier components and downlink carrier components, and relates to a base station apparatus, a mobile station apparatus, and a wireless communication method.

BACKGROUND ART

Conventionally, the evolution in the radio access system and radio network of cellular mobile communication (hereinafter, referred to as "Long Term Evolution" (LTE) or "Evolved Universal Terrestrial Radio Access" (EUTRA)) and the radio access system and radio network (hereinafter, referred to as "Long Term Evolution-Advanced" (LTE-A) or "Advanced Evolved Universal Terrestrial Radio Access" (A-EUTRA)), which realize higher-speed data communication using a frequency band wider than that of LTE, have been under study in the third Generation Partnership Project (3GPP).

In LTE, orthogonal frequency division multiplexing (OFDM) system which is multicarrier transmission is used as the communication system of radio communication from a base station apparatus to a mobile station apparatus (downlink). Moreover, as the communication system of the radio communication from a mobile station apparatus to a base station apparatus (uplink), SC-FDMA (Single-Carrier Frequency Division Multiple Access) system which is single carrier transmission is used.

In LTE, on a downlink, a synchronization channel (SCH), a physical broadcast channel (PBCH), a physical downlink control channel (PDCCH), a physical downlink shared channel (PDSCH), a physical multicast channel (PMCH), a physical control format indicator channel (PCFICH), and a physical HARQ indicator channel (Physical Hybrid automatic repeat request Indicator Channel; PHICH) are allocated. On an uplink, a physical uplink shared channel (PUSCH), a physical uplink control channel (PUCCH), and a physical random access channel (PRACH) are allocated.

The purposes of using the physical random access channel are to establish synchronization between a mobile station apparatus and a base station apparatus on an uplink and to request for the allocation of radio resources of the uplink. When the mobile station apparatus and the base station apparatus are out of synchronization, when the mobile station apparatus has data information to be transmitted to the base station apparatus by means of a physical uplink shared channel, or when the base station apparatus notifies the mobile station apparatus by means of a physical downlink control channel so as to start random access procedure, the mobile station apparatus activates random access.

There are two access methods for random access: contention based random access and non-contention based random access. The contention based random access is an access method which may cause collision between mobile station apparatuses, and is the typically performed random access. The non-contention based random access is an access method which does not cause collision between the mobile station apparatuses, and is the random access which is performed at the initiative of a base station apparatus in a special case, such as during handover, in order to establish synchronization between the mobile station apparatus and the base station apparatus.

In the random access, the mobile station apparatus transmits only a preamble in order to establish synchronization. The preamble includes a signature which is a signal pattern representing information. Here, several tens of types of signatures are prepared so as to be able to represent several bits of information. At present, a mobile station apparatus is assumed to transmit 6 bits of information using the preamble, and 64 types of signatures are assumed to be prepared.

FIG. 16 is a view showing an example of the procedure of the contention based random access according to a conventional art. First, a mobile station apparatus 1, based on the downlink channel quality or the like, determines a range of signatures to be selected, and randomly selects a signature from the selected range of signatures and transmits a preamble by means of a physical random access channel (Message 1 (M1)).

Abase station apparatus 3, upon receipt of the preamble transmitted from the mobile station apparatus 1, calculates, from the preamble, a deviation in synchronization timing between the mobile station apparatus 1 and the base station apparatus 3, and performs scheduling (allocation of radio resources of an uplink, and specifying of a transmission format (message size) and the like) for the mobile station apparatus 1 to transmit Message 3. Then, the base station apparatus 3 allocates a temporary C-RNTI (Cell-Radio Network Temporary Identifier) to the mobile station apparatus 1, and arranges an RA-RNTI (Random. Access-Radio Network Temporary Identifier) corresponding to a physical random access channel having received the preamble, into the physical downlink control channel, and transmits a random access response including deviation information of the synchronization timing, scheduling information, the temporary C-RNTI, and the number (also referred to as a random ID or a preamble ID) of a signature of the received preamble, by a physical downlink shared channel which the radio resource allocation included in the physical downlink control channel indicates (Message 2 (M2)).

After confirming that the physical downlink control channel includes the RA-RNTI, the mobile station apparatus 1 confirms the content of the random access response arranged in the physical downlink shared channel which the radio resource allocation included in the physical downlink control channel indicates. Then, the mobile station apparatus 1 extracts the response including the number of the signature of the preamble which the mobile station apparatus 1 transmitted, corrects the deviation in synchronization timing, and transmits Message 3 including information, such as a connection request, by means of the allocated radio resource and transmission format of the physical uplink shared channel (Message (M3)).

The base station apparatus 3, upon receipt of the Message 3 from the mobile station apparatus 1, transmits to the mobile station apparatus 1 a contention resolution indicating that the mobile station apparatus 1 has succeeded in random access, i.e., no collision of preambles has occurred between the mobile station apparatuses 1, or indicating that the mobile station apparatus 1, when a collision of preambles is occurring between the mobile station apparatuses 1, has overcome the collision of preambles (Message 4 (M4)).

If having succeeded in receiving the contention resolution, the mobile station apparatus 1 determines that the random access is successful, and terminates the processing related to the random access. Note that, if not having detected the number of a signature of the transmitted preamble within a random access response receiving period, or if not having detected the contention resolution within a contention resolution receiving period, the mobile station apparatus 1 starts again from the transmission of the preamble.

FIG. 17 is a view showing an example of the procedure of the non-contention based random access according to the conventional art. First, the base station apparatus 3 notifies the mobile station apparatus 1 of the information indicating the number of a signature and the radio resource of a physical random access channel, using a physical downlink control channel and the like. The mobile station apparatus 1 transmits a preamble including a signature of the number notified from the base station apparatus 3, by means of the physical random access channel notified from the base station apparatus 3 (Message 1 (N1)).

The base station apparatus 3, upon receipt of the preamble including the signature of the number notified to the mobile station apparatus 1, calculates from the preamble a deviation in synchronization timing between the mobile station apparatus 1 and the base station apparatus 3. Then, the base station apparatus 3 arranges, into the physical downlink control channel, an RA-RNTI corresponding to a physical random access channel having received the preamble, and transmits a random access response including the deviation information of synchronization timing and the number of a signature of the received preamble to a physical downlink shared channel which the radio resource allocation included in the physical downlink control channel indicates (Message 2 (N2)).

After confirming that the physical downlink control channel includes the RA-RNTI, the mobile station apparatus 1 confirms the content of the random access response arranged in the physical downlink shared channel which the radio resource allocation included in the physical downlink control channel indicates. Then, if the content includes the number of the signature of the preamble which the mobile station apparatus 1 transmitted, the mobile station apparatus 1 determines that the random access is successful, and terminates the processing related to the random access (see Non-Patent Document 1, Paragraph 5.1).

In LTE-A, there is a need for backward compatibility with LTE, in other words, there is a need to enable a base station apparatus of LTE-A to simultaneously perform radio communication with mobile station apparatuses of both LTE-A and LTE and also enable a mobile station apparatus of LTE-A to perform radio communication with base station apparatuses of both LTE-A and LTE. Therefore, it is under study that LTE-A uses the same channel structure as LTE does.

For example, in LTE-A, a technique (also referred to as spectrum aggregation, carrier aggregation, frequency aggregation, or the like) has been proposed for using a plurality of frequency bands (hereinafter, referred to as carrier components (CC) or component carriers (CC)), each having the same channel structure as that of LTE, as one frequency band (wide frequency band).

Specifically, in communications using the frequency aggregation, for each downlink carrier component, a physical broadcast channel, a physical downlink control channel, a physical downlink shared channel, a physical multicast channel, a physical control format indicator channel, and a physical HARQ indicator channel are transmitted, and for each physical uplink carrier component, a physical uplink shared channel, a physical uplink control channel, and a physical random access channel are allocated. That is, the frequency aggregation is a technique, wherein on an uplink and on a downlink, a base station apparatus and a plurality of mobile station apparatuses simultaneously transmit/receive a physical uplink control channel, a physical uplink shared channel, a physical downlink control channel, a physical downlink shared channel, and the like together with a plurality of pieces of data information or a plurality of pieces of control information using a plurality of carrier components (see Non patent literature 2, Chapter 5).

CITATION LIST

Non Patent Literature

Non Patent Literature 1: "3GPP T536.321 v8.5.0 (2009-03)", Mar. 17, 2009

Non Patent Literature 2: "3GPP TR36.814 v1.0.2 (2009-03)", May, 2009

DISCLOSURE OF THE INVENTION

However, in the conventional art, a base station apparatus and a mobile station apparatus perform communications by means of one set of an uplink carrier component and a downlink carrier component, and therefore if the base station apparatus allocates a plurality of uplink carrier components and downlink carrier components to the mobile station apparatus, there is a problem that a physical downlink control channel instructing to start random access procedure, the physical downlink control channel being transmitted by means of a downlink carrier component, cannot indicate that a radio resource (random access resource) of a physical random access channel corresponding to which downlink carrier component instructs the start of random access procedure.

The present invention has been made in view of the above circumstances and has an object to provide a wireless communication system, a base station apparatus, a mobile station apparatus, and a wireless communication method, wherein when the base station apparatus allocates a plurality of uplink carrier components and downlink carrier components to the mobile station apparatus, the mobile station apparatus can determine that a physical downlink control channel instructing to start random access procedure, the physical downlink control channel being received by means of any one of the downlink carrier components, indicates that a radio resource (random access resource) of a physical random access channel corresponding to which downlink carrier component instructs the start of random access procedure.

(1) In order to achieve the above-mentioned object, the present invention takes the following measures. That is, the wireless communication system of the present invention is a wireless communication system in which a base station apparatus and a mobile station apparatus communicate with each other using a plurality of component carriers, wherein the base station apparatus comprises: a random access controller which preliminarily allocates random access resources corresponding to a specific downlink component carrier by means of which the mobile station apparatus can start a random access communication; and a transmission processor which transmits control information instructing to start random access procedure, and wherein the mobile station apparatus comprises a random access processor which, upon receipt of the control information instructing to start random access procedure, starts the random access procedure by means of the random access resource corresponding to the specific downlink component carrier preliminarily allocated by the base station apparatus.

(2) In the wireless communication system of the present invention, the transmission processor transmits the control information instructing to start random access procedure by means of one arbitrary downlink component carrier from among a plurality of downlink component carriers set in the mobile station apparatus.

(3) The wireless communication system of the present invention is a wireless communication system in which abase station apparatus and a mobile station apparatus communicate with each other using a plurality of component carriers, wherein the base station apparatus comprises: a random access controller which selects, from among random access resources corresponding to respective downlink component carriers set in the mobile station apparatus, a random access resource causing the mobile station apparatus to start a random access communication; and a transmission processor which transmits control information instructing to start random access procedure by means of a downlink component carrier corresponding to the selected random access resource, and wherein the mobile station apparatus comprises a random access processor which, upon receipt of the control information instructing to start random access procedure by means of any of the downlink component carriers, starts random access procedure by means of a random access resource corresponding to the downlink component carrier, by means of which the control information has been received.

(4) In the wireless communication system of the present invention, the base station apparatus and the mobile station apparatus communicate messages for random access with each other by means of an uplink component carrier including a random access resource, by means of which the mobile station apparatus has started the random access procedure, and a downlink component carrier corresponding to the uplink component carrier.

(5) In the wireless communication system of the present invention, the transmission processor transmits a radio resource control signal including information indicative of a random access resource corresponding to a specific downlink component carrier allocated to the mobile station apparatus.

(6) In the wireless communication system of the present invention, the control information instructing to start random access procedure further includes, from among the random access resources corresponding to the downlink component carrier, information indicative of a random access resource, by means of which the mobile station apparatus can start random access procedure, and information indicative of a signature.

(7) In the wireless communication system of the present invention, the random access controller, when instructing contention based random access as a random access method to the mobile station apparatus, sets the information indicative of a signature to a specific code point, and the random access processor, when the information indicative of a signature is the specific code point, selects contention based random access as the random access method.

(8) In the wireless communication system of the present invention, the random access processor, when having selected the contention based random access as the random access method, selects a random access resource for starting random access procedure from among random access resources corresponding to a specific downlink component carrier preliminarily allocated by the base station apparatus.

(9) In the wireless communication system of the present invention, the random access processor, when having selected the contention based random access as the random access method, selects a random access resource for starting random access procedure from among all the random access resources corresponding to the respective downlink component carriers set by the base station apparatus.

(10) The base station apparatus of the present invention is a base station apparatus which communicates with a mobile station apparatus using a plurality of component carriers, comprising: a random access controller that preliminarily allocates random access resources corresponding to a specific downlink component carrier by means of which the mobile station apparatus can start a random access communication; and a transmission processor that transmits control information instructing to start random access procedure.

(11) The base station apparatus of the present invention is a base station apparatus which communicates with a mobile station apparatus using a plurality of component carriers, comprising: a random access controller that selects, from among random access resources corresponding to respective downlink component carriers set in the mobile station apparatus, a random access resource causing the mobile station apparatus to start a random access communication; and a transmission processor that transmits control information instructing to start random access procedure by means of a downlink component carrier corresponding to the selected random access resource.

(12) The mobile station apparatus of the present invention is a mobile station apparatus which communicates with a base station apparatus using a plurality of component carriers, comprising a random access processor that, upon receipt of the control information instructing to start the random access procedure, starts random access procedure by means of a random access resource corresponding to a specific downlink component carrier preliminarily allocated by the base station apparatus.

(13) The mobile station apparatus of the present invention is a mobile station apparatus which communicates with a base station apparatus using a plurality of component carriers, comprising a random access processor that, upon receipt of the control information instructing to start the random access procedure by means of any of downlink component carriers, starts random access procedure by means of a random access resource corresponding to the downlink component carrier, by means of which the control information has been received.

(14) The wireless communication method of the present invention is a wireless communication method which is used in abase station apparatus communicating with a mobile station apparatus using a plurality of component carriers, the method comprising the steps of: preliminarily allocating random access resources corresponding to a specific downlink component carrier, by means of which the mobile station apparatus can start a random access communication; and transmitting control information instructing to start random access procedure.

(15) The wireless communication method of the present invention is a wireless communication method which is used in abase station apparatus communicating with a mobile station apparatus using a plurality of component carriers, the method comprising the steps of: selecting, from among random access resources corresponding to respective downlink component carriers set in the mobile station apparatus, a random access resource causing the mobile station apparatus to start a random access communication; and transmitting control information instructing to start random access procedure by means of a downlink component carrier corresponding to the selected random access resource.

(16) The wireless communication method of the present invention is a wireless communication method which is used in a mobile station apparatus communicating with abase station apparatus using a plurality of component carriers, the method comprising the step of: starting, upon receipt of the control information instructing to start random access procedure, the random access procedure by means of a random access resource corresponding to a specific downlink component carrier preliminarily allocated by the base station apparatus.

(17) The wireless communication method of the present invention is a wireless communication method which is used in a mobile station apparatus communicating with abase station apparatus using a plurality of component carriers, the method comprising the step of starting, upon receipt of the control information instructing to start random access procedure by means of any of downlink component carriers, the random access procedure by means of a random access resource corresponding to the downlink component carrier, by means of which the control information has been received.

According to the present invention, to a mobile station apparatus is allocated with a plurality of uplink carrier components and downlink carrier components by a base station apparatus, and can determine that a physical downlink control channel instructing to start random access procedure, the physical downlink control channel being received by means of any one of the downlink carrier components among the allocated downlink carrier components, indicates that a radio resource (random access resource) of a physical random access channel corresponding to which downlink carrier component instructs the start of random access procedure.

BEST MODES FOR CARRYING OUT THE INVENTION

First Embodiment

Hereinafter, a first embodiment of the present invention will be described with reference to the accompanying drawings.

Figure 1:
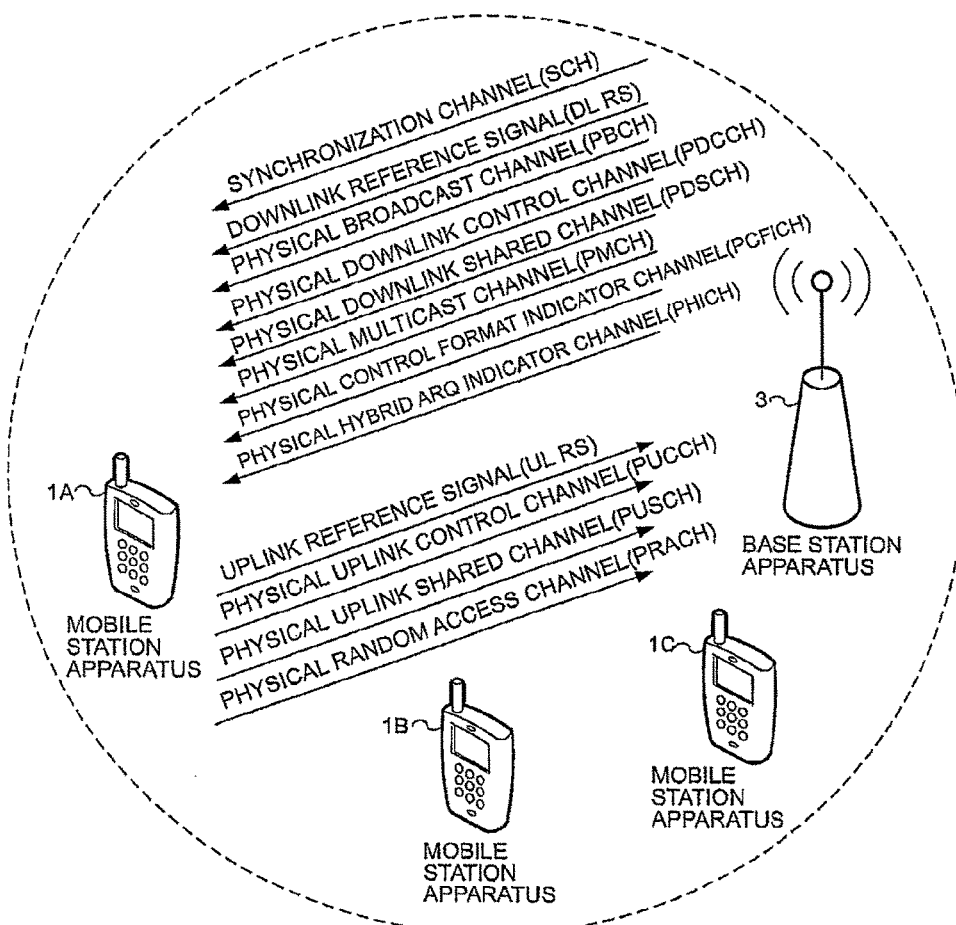
FIG. 1 is a conceptual view of a wireless communication system according to a first embodiment of the present invention.

FIG. 1 is a conceptual view of a wireless communication system according to the first embodiment of the present invention. In FIG. 1, a wireless communication system comprises mobile station apparatuses 1A-1C and a base station apparatus 3. The mobile station apparatuses 1A-1C and the base station apparatus 3 perform communications using frequency aggregation to be described later.

FIG. 1 shows that in the radio communication from the base station apparatus 3 to the mobile station apparatus 1A-1C (downlink), a synchronization channel (SCH), a downlink pilot channel (or referred to as also a "downlink reference signal (DL RS)"), a physical broadcast channel (PBCH), a physical downlink control channel (PDCCH), a physical downlink shared channel (PDCCH), a physical multicast channel (PMCH), a physical control format indicator channel (PCFICH), and a physical HARQ indicator channel (physical hybrid ARQ indicator channel; PHICH) are allocated.

Moreover, FIG. 1 shows that in the radio communication from the mobile station apparatuses 1A-1C to the base station apparatus 3 (uplink), an uplink pilot channel (or referred to as also an "uplink reference signal (UL RS)"), a physical uplink control channel (PUCCH), a physical uplink shared channel (PUSCH), and a physical random access channel (PRACH) are allocated.

Figure 2:
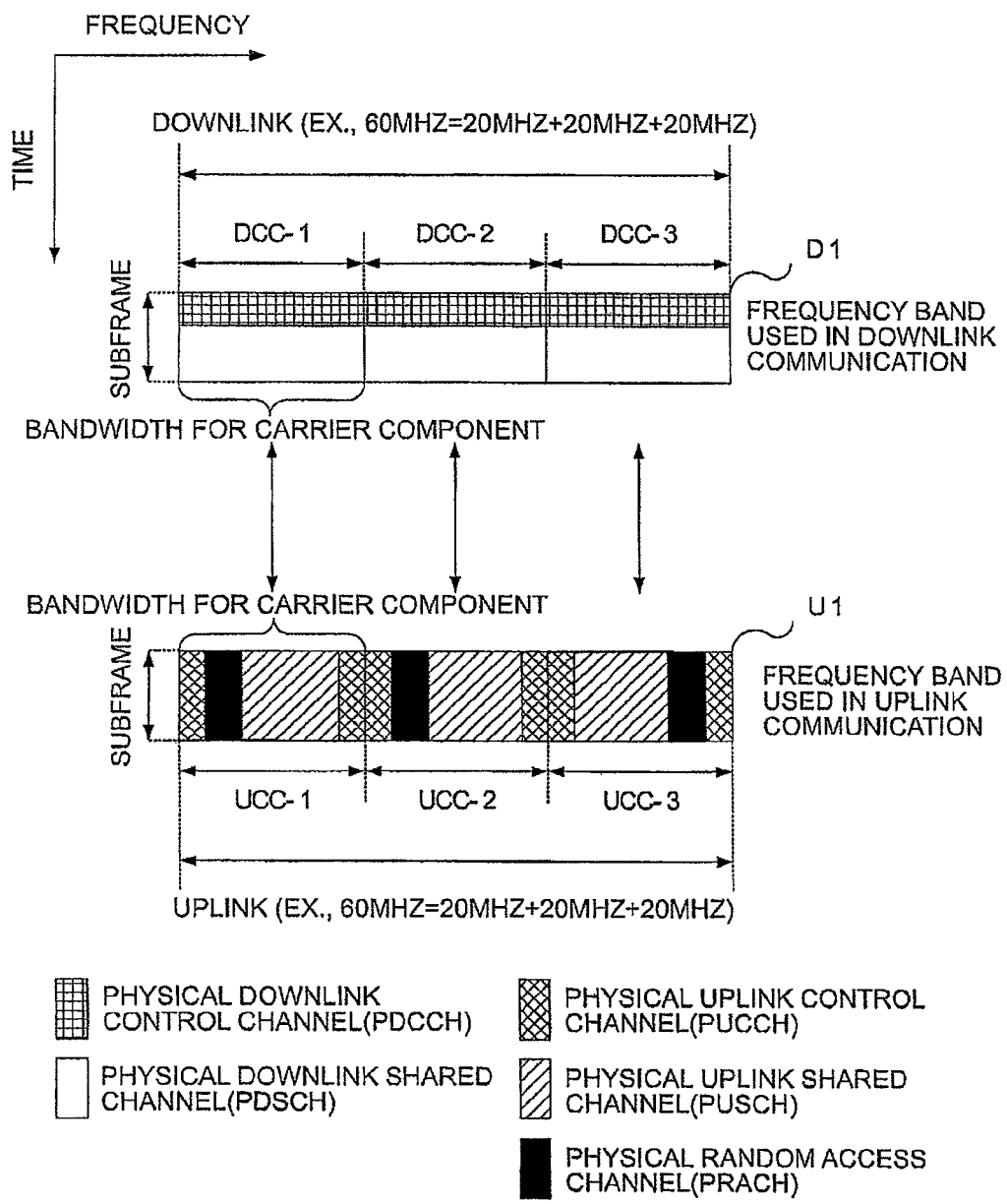
FIG. 2 is a view showing an example of frequency aggregation processing according to the embodiment.

FIG. 2 is a view showing an example of the frequency aggregation processing according to the embodiment. In FIG. 2, the horizontal axis represents a frequency domain and the vertical axis represents a time domain. As shown in FIG. 2, a downlink subframe D1 comprises a subframe of three carrier components (DCC-1; downlink component carrier-1, DCC-2, DCC-3) each having a bandwidth of 20 MHz. In each subframe of this downlink carrier component, a region hatched by lattice lines where the physical downlink control channel is arranged and a non-hatched region where the physical downlink shared channel is arranged are time-multiplexed.

On the other hand, an uplink subframe U1 comprises three carrier components (UCC-1; uplink component carrier-1, UCC-2, UCC-3) each having a bandwidth of 20 MHz. In each subframe of this uplink carrier component, a region hatched by diagonal lattice lines where the physical uplink control channel is arranged, a region hatched by diagonally left lines where the physical uplink shared channel is arranged, and a region filled with black color where the physical random access channel is arranged, are frequency-multiplexed.

For example, the base station apparatus 3, in a certain downlink subframe, arranges a signal into the physical downlink shared channel of one or more downlink carrier components among three downlink carrier components and transmits the same to the mobile station apparatus 1. Moreover, the mobile station apparatus 1, in a certain uplink subframe, arranges a signal into a physical uplink shared channel of one or more uplink carrier components among three uplink carrier components and transmits the same to the base station apparatus 3. Moreover, the mobile station apparatus 1, in a certain uplink subframe, arranges a preamble into a physical random access channel (random access resource) of one uplink carrier component among three uplink carrier components and transmits the same to the base station apparatus 3.

The uplink carrier component and the downlink carrier component, by means of which the mobile station apparatus 1 and the base station apparatus 3 transmit/receive some of or all of random access messages, are paired. The base station 3 broadcasts by means of the respective downlink carrier components information related to random access transmission, such as information indicative of an uplink carrier component paired with a downlink carrier component, information indicative of the configuration of a physical random access channel, which the downlink carrier component corresponds to, and the transmission conditions of random access to notify the mobile station apparatus 1.

For example, in FIG. 2, when DCC-1 and UCC-1, DCC-2 and UCC-2, and DCC-3 and UCC-3 each serve as a pair transmitting/receiving a random access message, the base station apparatus 3 broadcasts information indicative of an uplink carrier component (UCC-1, UCC-2, UCC-3) paired with a downlink carrier component and information related to the random access transmission in a physical random access channel, which the downlink carrier component corresponds to, by means of the respective downlink carrier components (DCC-1, DCC-2, DCC-3). When the mobile station apparatus 1 transmits Message 1 (preamble) by means of the physical random access channel of UCC-1, the base station apparatus 3 and the mobile station apparatus 1 performs transmission/reception of Message 2 (random access response) by means of DCC-1. Note that the information related to random access transmission of a plurality of downlink carrier components may be transmitted by means of one downlink carrier component or respective downlink carrier components.

Figure 3:
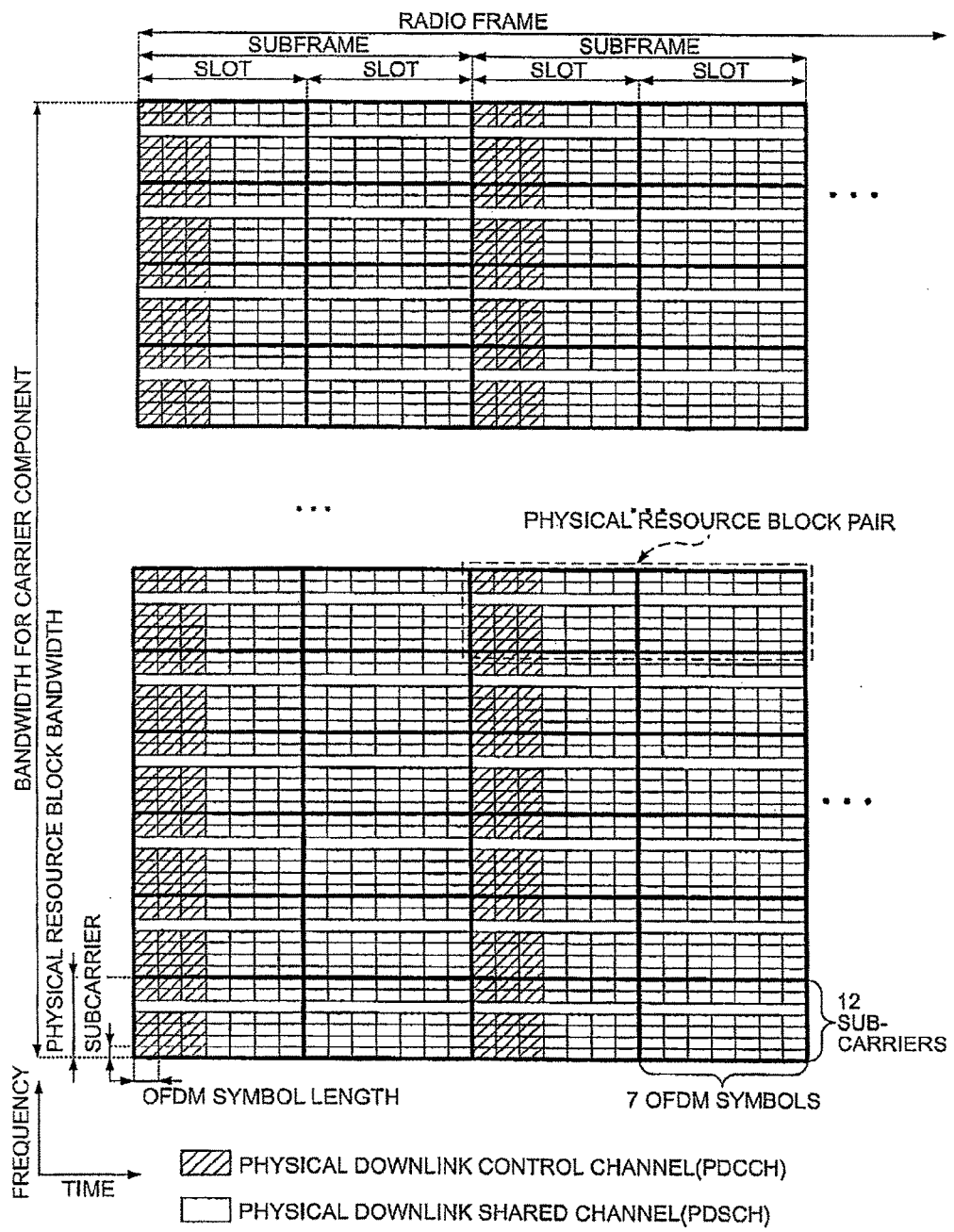
FIG. 3 is a schematic diagram showing an example of the configuration of a downlink radio frame according to the embodiment.

FIG. 3 is a schematic diagram showing an example of the configuration of the downlink radio frame according to the embodiment. FIG. 3 shows the configuration of a radio frame in a certain downlink carrier component. In FIG. 3, the horizontal axis represents the time domain and the vertical axis represents the frequency domain. As shown in FIG. 3, the radio frame of the downlink carrier component comprises a plurality of downlink physical resource block (Physical Resource Block; PRB) pairs (e.g., region surrounded by a broken line of FIG. 3). This downlink physical resource block pair is the unit of allocation or the like of radio resources, and comprises a predetermined frequency band (PRB bandwidth; 180 kHz) and a predetermined time width (two slots=one subframe; 1 ms).

One downlink physical resource block pair comprises two downlink physical resource blocks (PRB bandwidth×slot) continuous in the time domain. One downlink physical resource block (the unit surrounded by a thick line in FIG. 3) comprises 12 subcarriers (15 kHz) in the frequency domain, and comprises seven OFDM symbols (71 μs) in the time domain.

In the time domain, there are a slot (0.5 ms) comprising seven OFDM symbols (71 μs), a subframe (1 ms) comprising two slots, and a radio frame (10 ms) comprising ten subframes. In the frequency domain, a plurality of downlink physical resource blocks is arranged in accordance with the bandwidth of a downlink carrier component. Note that a unit comprising one subcarrier (15 kHz) and one OFDM symbol (71 μs) is referred to as a downlink resource element (RE).

Hereinafter, the channels allocated within a downlink radio frame are described. For each subframe on a downlink, a physical downlink control channel, a physical downlink shared channel, and a downlink reference signal are allocated, for example. The physical downlink control channel is arranged from the first OFDM symbol of a subframe, and the physical downlink shared channel is arranged in the remaining OFDM symbols of the subframe. With regard to the downlink pilot channel, the illustration thereof is omitted in FIG. 3 for simplicity of description, but the downlink pilot channels are dispersed and arranged in the frequency domain and the time domain.

First, signals arranged in the physical downlink control channel are described. In the physical downlink control channel, signals of downlink control information (DCI), such as a downlink grant (or referred to as also a "downlink assignment") and an uplink grant, which is the information used in controlling communications, are arranged. Note that the downlink control information has a plurality of formats.

Note that, the downlink grant comprises information indicative of the modulation scheme for a physical downlink shared channel, information indicative of a coding scheme, information indicative of the allocation of radio resources, information related to HARQ (Hybrid Automatic Repeat Request), and the like. Moreover, the uplink grant comprises information indicative of the modulation scheme for a physical uplink shared channel, information indicative of a coding scheme, information indicative of the allocation of radio resources, information related to HARQ, and the like.

Note that, HARQ is, for example, a technique, wherein when the mobile station apparatus 1 (or the base station apparatus 3) transmits to the base station apparatus 3 (or the mobile station apparatus 1) the success or failure (ACK (ACKnowledgement)/NACK (Negative-ACKnowledgement)) in decoding data information and if the mobile station apparatus 1 (or the base station apparatus 3) cannot decode the data information due to an error (NACK), then the base station apparatus 3 (or the mobile station apparatus 1) retransmits the signal and the mobile station apparatus 1 (or the base station apparatus 3) performs decoding processing on a composite signal of the signal which the mobile station apparatus 1 (or the base station apparatus 3) received again and the already received signal.

To the downlink control information, a sequence obtained by exclusive-ORing a cyclic redundancy check (CRC) code (error detection code), which is generated from a bit sequence of downlink control information, and an identifier is added. The mobile station apparatus 1 can obtain the cyclic redundancy check code by further exclusive-ORing this sequence using the same identifier. That is, the mobile station apparatus 1 can determine from the identifier included in the physical downlink control channel whether or not the physical downlink control channel is the one transmitted to the mobile station apparatus 1.

For example, when a C-RNTI (Cell-Radio Network Temporary Identifier), which the base station apparatus 3 allocated to the mobile station apparatus 1, is included in the physical downlink control channel, the mobile station apparatus 1 determines that the physical downlink control channel is indicating the allocation of radio resources of the physical downlink shared channel addressed to the mobile station apparatus 1.

When the base station apparatus 3 instructs the mobile station apparatus 1 to start random access procedure, the base station apparatus 3 transmits the physical downlink control channel including downlink control information of a specific format, in which a specific region is set to a predetermined code point (e.g., a flag indicative of the type of the format is "1", and a flag indicative of the radio resource allocation method is "0", and all the pieces of information indicative of the allocation of radio resources are "1"), and the C-RNTI allocated to the mobile station apparatus 1 instructed to start random access procedure. Regions other than this specific region of the physical downlink control channel instructing to start random access procedure includes the information indicative of the number of a signature and information indicative of the radio resource of a physical random access channel, into which the mobile station apparatus 1 may arrange the preamble, among the radio resources of a physical random access channel which a downlink carrier component corresponds to.

The base station apparatus 3 sets to each mobile station apparatus 1 the physical random access channel corresponding to a specific downlink carrier component, by means of which the random access procedure can be started, and notifies this set information to the mobile station apparatus 1 by means of a radio resource control signal or the like. Note that the base station apparatus 3 may set the relevant information common among all the mobile station apparatuses and broadcast this information.

Next, signals arranged in the physical downlink shared channel are described. The signal of data information (transport block) is arranged in the physical downlink shared channel. In the embodiment, a downlink grant and a physical downlink shared channel whose allocation of radio resources is indicated by the downlink grant are arranged in the same subframe.

Figure 4:
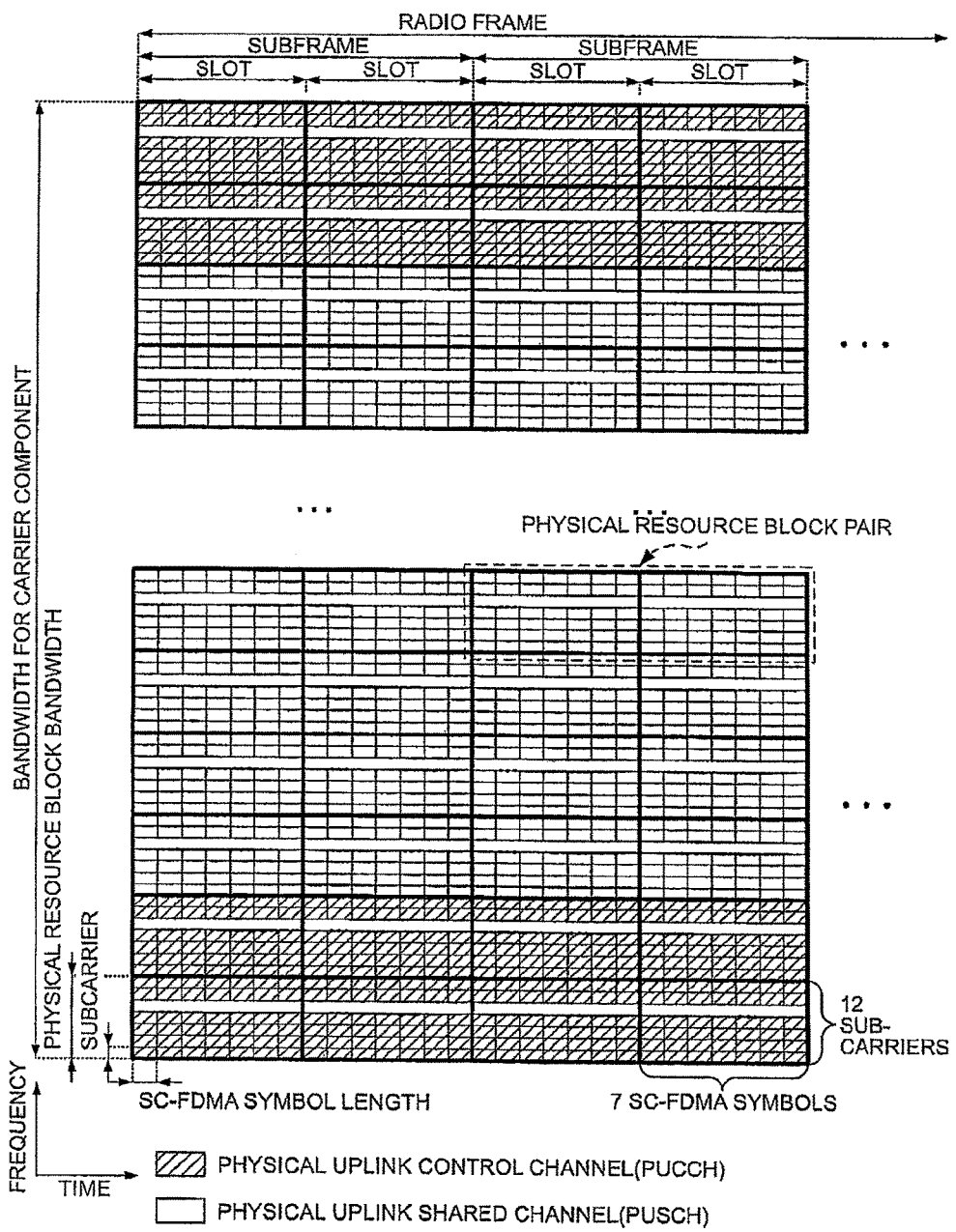
FIG. 4 is a schematic diagram showing an example of the configuration of an uplink radio frame according to the embodiment.

FIG. 4 is a schematic diagram showing an example of the configuration of the uplink radio frame according to the embodiment. FIG. 4 shows the configuration of the radio frame in a certain uplink carrier component. In FIG. 4, the horizontal axis represents the time domain and the vertical axis represents the frequency domain. As shown in FIG. 4, the radio frame of the uplink carrier component comprises a plurality of uplink physical resource block pairs (e.g., region surrounded by a dotted line of FIG. 4). This uplink physical resource block pair is the unit of allocation or the like of radio resources, and comprises a predetermined frequency band (PRB bandwidth; 180 kHz) and a predetermined time width (two slots=one subframe; 1 ms).

One uplink physical resource block pair comprises two uplink physical resource blocks (PRB bandwidth×slot) continuous in time domain. One uplink physical resource block (the unit surrounded by a thick line in FIG. 4) comprises 12 subcarriers (15 kHz) in the frequency domain, and comprises seven SC-FDMA symbols (71 μs) in the time domain.

In the time domain, there are a slot (0.5 ms) comprising seven SC-FDMA symbols (71 μs), a subframe (1 ms) comprising two slots, and a radio frame (10 ms) comprising ten subframes. In the frequency domain, a plurality of uplink physical resource blocks is arranged in accordance with the bandwidth of an uplink carrier component. Note that a unit comprising one subcarrier (15 kHz) and one SC-FDMA symbol (71 μs) is referred to as an uplink resource element.

Hereinafter, the channels allocated within an uplink radio frame are described. For each subframe on an uplink, a physical uplink control channel, a physical uplink shared channel, a physical random access channel, and an uplink reference signal are allocated, for example. First, signals arranged in the physical random access channel are described. The physical random access channel (not shown) is arranged in a radio resource comprising a bandwidth of 72 uplink resource elements (six physical resource blocks) in the frequency domain and any of one subframe to three subframes in the time domain.

Moreover, a subcarrier interval of the physical random access channel is 1.25 kHz or 7.5 kHz and differs from the subcarrier interval (15 kHz) of the physical uplink control channel or the physical uplink shared channel. A plurality of radio resources of a physical random access channel are allocated in the radio frame (10 ms). The specific configuration of the radio resource of the physical random access channel is notified to the mobile station apparatus 1 as broadcast information.

In the physical random access channel, a preamble is arranged in order for the mobile station apparatus 1 and the base station apparatus 3 to synchronize with each other. The preamble includes a signature which is a signal pattern representing information, wherein several tens of types of signatures are prepared and several bits of information can be expressed.

Figure 5:
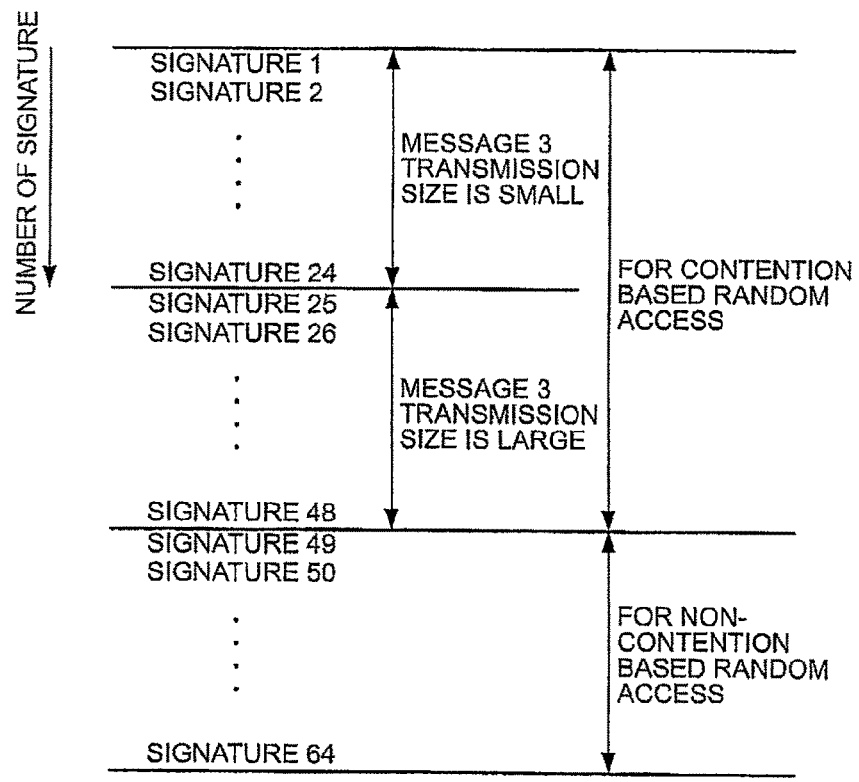
FIG. 5 is a schematic diagram showing an example of the configuration of a signature according to the embodiment.

FIG. 5 is a schematic diagram showing an example of the configuration of the signature according to the embodiment. In FIG. 5, the vertical axis represent the number of the signature, the signatures from. Signature 1 to Signature 48 are used for contention based random access, while the signatures from Signature 49 to Signature 64 are used for non-contention based random access.

The respective mobile station apparatuses 1 performing contention based random access as the random access method randomly select a signatures among Signature 1 to Signature 24 when the transmission size of Message 3 is small, while when the transmission size of Message 3 is large, the respective mobile station apparatuses 1 randomly select a signature from Signature 25 to Signature 48. The signature when the message size is small is typically selected when the channel performance is poor (or the distance between the mobile station apparatus 1 and the base station apparatus 3 is far), while the signature when the message size is large is selected when the channel performance is good (or the distance between the mobile station apparatus 1 and the base station apparatus 3 is close).

The mobile station apparatus 1 performing non-contention based random access as the random access method is notified of any one signature, which the base station apparatus 3 has selected among the signatures from Signature 49 to Signature 64, by means of the physical downlink control channel and the like. Note that, when the information indicative of the number of a signature of the physical downlink control channel instructing to start random access procedure is a specific code point (e.g., all are set to "0"), the mobile station apparatus 1 performs contention based random access. The base station apparatus 3 transmits to the mobile station apparatus 1 the physical downlink control channel instructing to start random access procedure, but for example when there is no signature for non-contention based random access which can be allocated to the mobile station apparatus 1, the base station apparatus 3 notifies the mobile station apparatus 1 so as to start contention based random access, by means of the physical downlink control channel instructing to start random access procedure.

Next, signals arranged in the physical uplink control channel are described. A physical uplink control channel is allocated to an uplink physical resource block pair (the region hatched by diagonally left lines) at both ends of the bandwidth of the uplink carrier component. In the physical uplink control channel, there are arranged the signals of uplink control information (UCI), which are information used in controlling communications, such as channel quality information indicative of the downlink channel quality, a scheduling request (SR) indicative of a request for allocation of radio resources of an uplink, and ACK/NACK with respect to the physical downlink shared channel.

Next, signals arranged in the physical uplink shared channel are described. The physical uplink shared channel is allocated to an uplink physical resource block pair (non-hatched region) except for the physical uplink control channel and the physical random access channel. In the physical uplink shared channel, there is arranged the signal of data information (transport block) which is the information except for the uplink control information. In the embodiment, a physical uplink shared channel, whose allocation of radio resources is indicated by an uplink grant, is arranged in an uplink carrier component within a subframe in a predetermined period after receiving the uplink grant.

Next, the uplink reference signal is described. A demodulation reference signal (not shown) is arranged so as to be time-multiplexed with the radio resources of the physical uplink shared channel and physical uplink control channel. A sounding reference signal (not shown) is, in the time domain, arranged in the last SC-FDMA symbol in a subframe of a period which the base station apparatus 3 sets for each mobile station apparatus, while in the frequency domain, it is arranged in the frequency domain which the base station apparatus 3 set for each mobile station apparatus.

Figure 6:
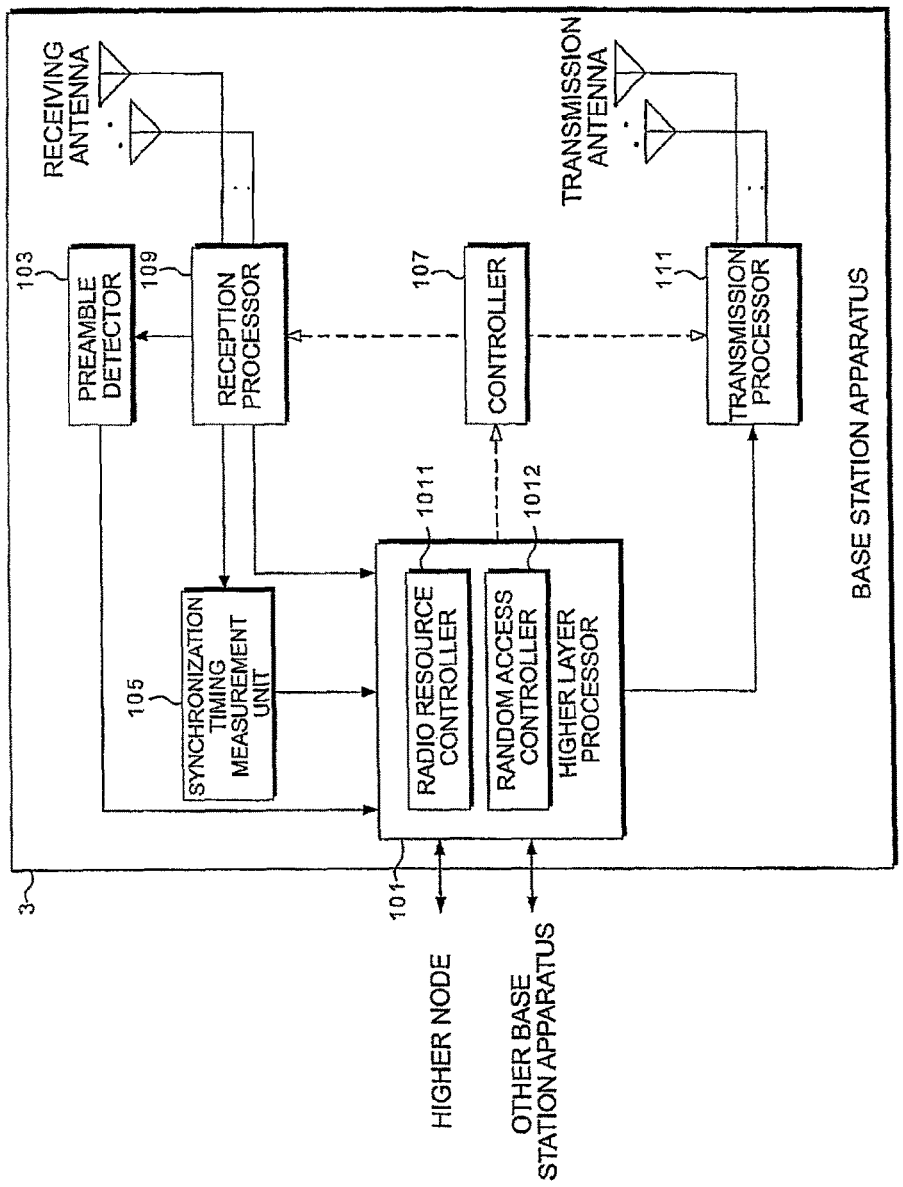
FIG. 6 is a schematic block diagram showing the configuration of a base station apparatus 3 according to the embodiment.

FIG. 6 is a schematic block diagram showing the configuration of the base station apparatus 3 according to the embodiment. As shown in the view, the base station apparatus 3 comprises an higher layer processor 101, a preamble detector 103, a synchronization timing measurement unit 105, a controller 107, a reception processor 109, a plurality of receiving antennas, a transmission processor 111, and a plurality of transmission antennas. Moreover, the higher layer processor 101 comprises a radio resource controller 1011 and a random access controller 1012. Note that, in FIG. 6, the receiving antennas and the transmission antennas are separately arranged, but the antennas may be shared using a thyristor or the like capable of switching the input/output of a signal.

The higher layer processor 101 outputs the data information for each downlink carrier component to the transmission processor 111. Moreover, the higher layer processor 101 performs processing for a packet data convergence protocol (PDCP) layer, a radio link control (RLC) layer, and a radio resource control (RRC) layer. The radio resource controller 1011 of the higher layer processor 101 performs the management and the like of various kinds of configuration data, communication conditions, and buffer conditions of the respective mobile station apparatuses 1. The random access controller 1012 of the higher layer processor 101 performs the control related to random access of the respective mobile station apparatuses 1.

In the above-described processing, the radio resource controller 1011 of the higher layer processor 101 allocates a plurality of uplink carrier components and downlink carrier components to the mobile station apparatus 1 in accordance with the number of downlink carrier components and uplink carrier components which the base station apparatus 3 can use for radio communication, the number of downlink carrier components and uplink carrier components which the mobile station apparatus 1 can simultaneously transmit or receive, and the like.

The radio resource controller 1011 generates the information arranged in each channel of each downlink carrier component or obtains the same from an higher node, and outputs the same to the transmission processor 111 for each downlink carrier component. For example, the radio resource controller 1011 generates downlink control information and a random access response which is one type of data information, and outputs the same to the transmission processor 111.

The radio resource controller 1011 allocates, among the radio resources of the uplink carrier component allocated to the mobile station apparatus 1, a radio resource, into which the mobile station apparatus 1 arranges a physical uplink shared channel (data information), to the mobile station apparatus 1. Moreover, the radio resource controller 1011 allocates, among the radio resources of the downlink carrier component allocated to the mobile station apparatus 1, a radio resource into which a physical downlink shared channel (data information) with respect to the mobile station apparatus 1 is arranged. The radio resource controller 1011 generates the downlink grant and uplink grant indicative of the relevant allocation of radio resources, and transmits the same to the mobile station apparatus 1 via the transmission processor 111. Moreover, the radio resource controller 1011 includes the C-RNTI allocated to the mobile station apparatus 1, which the downlink grant or uplink grant corresponds to, into the relevant downlink grant and uplink grant.

The radio resource controller 1011, based on the control information from the random access controller 1012, generates the physical downlink control channel instructing to start random access procedure. The radio resource controller 1011, based on the channel quality of a downlink carrier component allocated to the mobile station apparatus 1 instructing to start random access procedure, the overhead of a physical downlink control channel, and the like, selects one arbitrary downlink carrier component, and transmits a physical downlink control channel instructing to start random access procedure, to the mobile station apparatus 1 via the transmission processor 111 by means of the selected downlink carrier component. Moreover, the radio resource controller 1011 includes information indicative of the radio resource of the physical random access channel corresponding to the downlink carrier component allocated to the mobile station apparatus 1 which the relevant physical downlink control channel corresponds to, the information indicative of the number of a signature, and the C-RNTI, into the physical downlink control channel instructing to start random access procedure.

The radio resource controller 1011 selects one downlink carrier component based on the control information from the random access controller 1012, and allocates, among the radio resources within the selected downlink carrier component, a radio resource in which a random access response is arranged. Moreover, the radio resource controller 1011 includes the RA-RNTI, which is input from the random access controller 1012, into the downlink grant indicative of the relevant allocation of radio resources.

The radio resource controller 1011 selects one uplink carrier component based on the control information from the random access controller 1012, and allocates, among the radio resources within the selected uplink carrier component, a radio resource in which Message 3 is arranged. Moreover, the radio resource controller 1011 generates the uplink grant indicative of the relevant allocation of radio resources, includes the same into the random access response, and transmits the same to the mobile station apparatus 1 via the transmission processor 111. Note that the uplink grant included in the random access response includes neither a cyclic redundancy check code nor a mobile station apparatus identifier. The random access response includes a deviation amount of the synchronization timing for each of a plurality of signatures input from the random access controller 1012, a temporary C-RNTI, and the uplink grant which the radio resource controller 1011 generated.

Based on the uplink control information (ACK/NACK, channel quality information, scheduling request) notified by means of the physical uplink control channel from the mobile station apparatus 1, the conditions of a buffer of the mobile station apparatus 1, and various kinds of configuration data of the respective mobile station apparatuses 1 which the radio resource controller 1011 set, the radio resource controller 101 generates control information in order to control the reception processor 109 and the transmission processor 111, and outputs the same to the controller 107.

In the above-described processing, the random access controller 1012 of the higher layer processor 101 generates: broadcast information including the information related to random access, such as the information indicative of a pair of an uplink carrier component and a downlink carrier component for transmitting/receiving some of or all of the messages, configuration (allocation of radio resources and the like of a physical random access channel) of a physical random access channel within the uplink carrier component, and the transmission conditions (random access load) of the random access; a random access response; contention resolution; and the like, and outputs these control information to the radio resource controller 1011 so as to transmit the same to the mobile station apparatus 1 via the transmission processor 111.

The random access controller 1012 sets physical random access channels corresponding to a specific downlink carrier component, by means of which random access procedure can be started, to the respective mobile station apparatuses 1 based on the transmission conditions of the random access, the channel quality of an uplink carrier component, and the like, generates information indicative of the set specific downlink carrier component, and includes this information into a radio resource control signal and the like, and outputs the resulting control information to the radio resource controller 1011 so as to transmit the same to the respective mobile station apparatuses 1 via the transmission processor 111.

For example, when the base station apparatus 3 and the mobile station apparatus 1 are out of synchronization while there is data information to be transmitted in the mobile station apparatus 1, the random access controller 1012 determines to instruct the mobile station apparatus 1 to start random access procedure. The random access controller 1012 allocates the radio resource and signature of a physical random access channel corresponding to a specific downlink carrier component set in the mobile station apparatus 1. The random access controller 1012 generates the physical downlink control channel for instructing the mobile station apparatus 1 to start random access procedure, and outputs the same to the radio resource controller 1011 so as to output the same to the transmission processor 111.

The random access controller 1012 outputs the number of a signature and the deviation amount of synchronization timing to the radio resource controller 1011 based on the information about the physical random access channel, the number of a signature, and the deviation amount of synchronization timing input from the preamble detector 103, and outputs the same to the radio resource controller 1011 so as to generate a random access response. Moreover, the random access controller 1012 calculates the RA-RNTI from the information about the physical random access channel having detected the signature input from the preamble detector 103, and outputs the same to the radio resource controller 1011.

The random access controller 1012, based on the information about the physical random access channel having detected the signature input from the preamble detector 103, selects a downlink carrier component paired with an uplink carrier component in which a preamble has been detected, and outputs the same to the radio resource controller 1011 so as to transmit a random access response by means of the selected downlink carrier component. Moreover, the random access controller 1012 selects an uplink carrier component in which the preamble has been detected, and outputs control information to the radio resource controller 1011 so as to allocate, among the radio resources of the selected uplink carrier component, a radio resource for transmitting Message 3.

The random access controller 1012 outputs control information to the radio resource controller 1011 so as to transmit, by means of a downlink carrier component, contention resolution to the mobile station apparatus 1 to which the radio resource has been allocated by means of the random access response, the mobile station apparatus 1 having transmitted Message 3.

The controller 107, based on the control information from the higher layer processor 101, generates a control signal for controlling the reception processor 109 and the transmission processor 111. The controller 107 outputs the generated control signal to the reception processor 109 and the transmission processor 111, and controls the reception processor 109 and the transmission processor 111.

The reception processor 109, in accordance with the control signal input from the controller 107, separates, demodulates and decodes a reception signal received from the mobile station apparatus 1 via the receiving antenna, and outputs the decoded information to the higher layer processor 101. Moreover, the reception processor 109 outputs the separated uplink reference signal to the synchronization timing measurement unit 105, and outputs the separated physical random access channel to the preamble detector 103.

Specifically, the reception processor 109 converts (down-converts) the signal of each uplink carrier component, which is received via each receiving antenna, into an intermediate frequency, removes an unwanted frequency component, and controls an amplification level so that the signal level is adequately maintained, and orthogonally demodulates a received signal based on the in-phase component and quadrature component of the received signal, and converts the orthogonally demodulated analog signal into a digital signal. The reception processor 109 removes the portion corresponding to a guard interval (GI) from the converted digital signal. The reception processor 109 performs Fast Fourier Transform (FFT) on the signal, from which the guard interval has been removed, to extract a signal in the frequency domain.

The reception processor 109 separates the extracted signal into the signals arranged in a physical random access channel, in a physical uplink control channel, in a physical uplink shared channel, in a demodulation reference signal, and in a sounding reference signal, respectively, for each uplink carrier component. Note that this separation is performed based on the radio resource allocation information which the base station apparatus 3 determined in advance and notified to each mobile station apparatus 1. Moreover, the reception processor 109 calculates, from the separated uplink reference signal, an estimated value of a channel and performs compensation of the channels of the physical uplink control channel and the physical uplink shared channel.

The reception processor 109 outputs the separated physical random access channel to the preamble detector 103, and outputs the separated uplink reference signal to the synchronization timing measurement unit 105. The reception processor 109 performs Inverse Discrete Fourier Transform (IDFT) on the physical uplink shared channel to obtain a modulation symbol. Then, with respect to the respective modulation symbols of the physical uplink control channel and the physical uplink shared channel, the reception processor 109 demodulates the reception signal using a predetermined modulation scheme, such as binary phase shift keying (BPSK), quadrature phase shift keying (QPSK), 16 quadrature amplitude modulation (16QAM), or 64 quadrature amplitude modulation (64QAM), or using a modulation scheme which the base station apparatus 3 notified to the respective mobile station apparatuses 1 in advance by means of the uplink grant.

The reception processor 109 decodes the demodulated coded-bit of the physical uplink control channel and the physical uplink shared channel at a predetermined coding rate of a predetermined coding scheme or at a predetermined coding rate, which the base station apparatus 3 notified the mobile station apparatuses 1 in advance by means of an uplink grant, of a predetermined coding scheme, and outputs the data information and the uplink control information to the higher layer processor 101. The reception processor 109 measures the power and the like of the reception signal of the uplink reference signal or the physical uplink shared channel received from the mobile station apparatus 1 to measure the channel reception quality of the uplink carrier component, and outputs the same to the higher layer processor 101.

The preamble detector 103 detects a plurality of preambles from the radio resource of a physical random access channel input from the reception processor 109, calculates a synchronization timing deviation amount from the respective preambles, and outputs the information about the physical random access channel in which a signature has been detected, the number of a signature, and the synchronization timing deviation amount to the higher layer processor 101. Moreover, from the number of times of reception of preambles, the preamble detector 103 also periodically notifies the higher layer processor 101 of the random access transmission conditions of the mobile station apparatus 1. The synchronization timing measurement unit 105 measures the uplink reference signal input from the reception processor 109 for the purpose of maintaining synchronization, measures the deviation in synchronization timing, and reports the measurement result to the higher layer processor 101.

The transmission processor 111, in accordance with the control signal input from the controller 107, generates a downlink reference signal, encodes and demodulates the data information and downlink control information input from the higher layer processor 101, arranges these demodulated information into a physical downlink control channel and a physical downlink shared channel, multiplexes the same with the generated downlink reference signal, and transmits the resulting signal to the mobile station apparatus 1 via the transmission antenna.

Specifically, the transmission processor 111, in accordance with the control signal input from the controller 107, performs encoding, such as turbo encoding, convolutional encoding, or block encoding, on the downlink control information and data information of the respective downlink carrier components input from the higher layer processor 101, and then modulates the encoded bit using a modulation scheme, such as QPSK, 16QAM, or 64QAM. Moreover, the transmission processor 111 generates, as the downlink reference signal, a sequence calculated by a rule which is predetermined based on a cell identifier (Cell ID) and the like for identifying the base station apparatus 3, the sequence being known by the base station apparatus 3, and multiplexes the downlink reference signal with the physical downlink control channel signal and the physical downlink shared channel signal.

The transmission processor 111 performs Inverse Fast Fourier Transform (IFFT) on the multiplexed modulation symbol, and performs OFDM modulation on the resulting symbol, adds a guard interval to the OFDM-modulated OFDM symbol, and generates a baseband digital signal, converts the baseband digital signal into an analog signal, generates the in-phase component and quadrature component of an intermediate frequency from the analog signal, removes the redundant frequency components with respect to the intermediate frequency band, converts (up-converts) the intermediate frequency signal into a high frequency signal, removes the redundant frequency components, and power-amplifies the resulting high frequency signal, and outputs the amplified signal to the transmission antenna for transmission.

Figure 7:
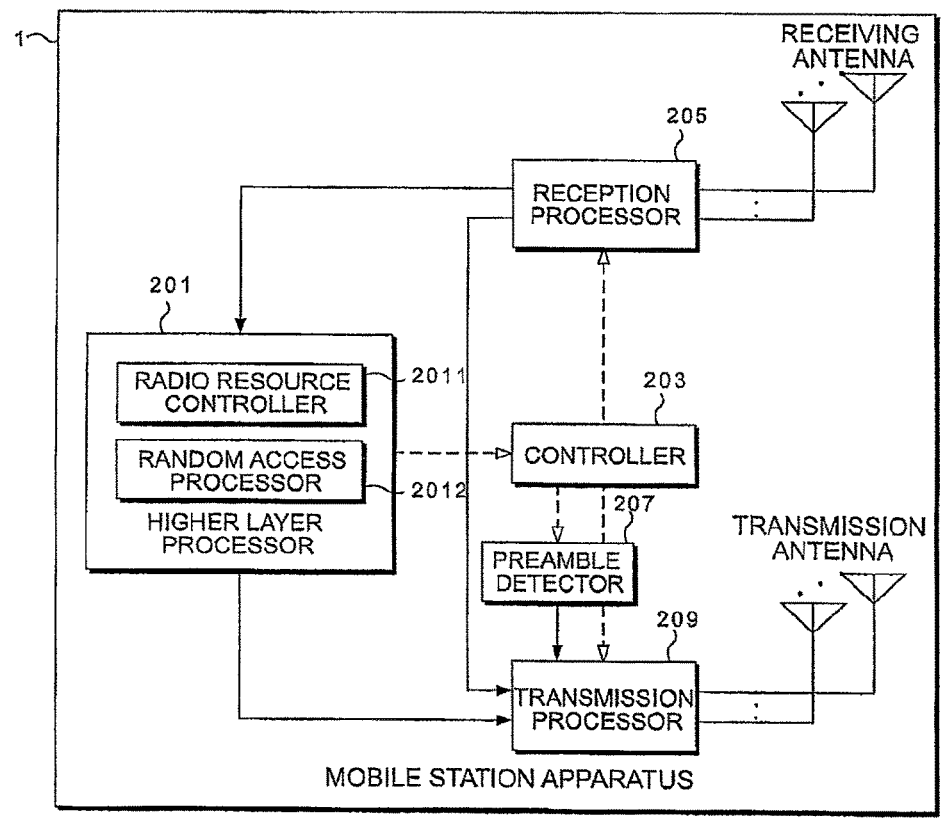
FIG. 7 is a schematic block diagram showing the configuration of a mobile station apparatus 1 according to the embodiment.

FIG. 7 is a schematic block diagram showing the configuration of the mobile station apparatus 1 according to the embodiment. As shown in the view, the mobile station apparatus 1 comprises a higher layer processor 201, a controller 203, a reception processor 205, a plurality of receiving antennas, a preamble generator 207, a transmission processor 209, and a plurality of transmission antennas. Moreover, the higher layer processor 201 comprises a radio resource controller 2011 and a random access processor 2012. Note that, in FIG. 7, the receiving antennas and the transmission antennas are separately configured, but the antennas may be shared using a thyristor or the like capable of switching the input/output of a signal.

The higher layer processor 201 outputs the data information for each uplink carrier component generated by the operation of a user or the like to the transmission processor 209. Moreover, the higher layer processor 201 performs the processing of a packet data convergence protocol layer, a radio link control layer, and a radio resource control layer. The radio resource controller 2011 of the higher layer processor 201 performs the management and the like of the various kinds of configuration data, communication conditions, and buffer conditions of the mobile station apparatus 1. The random access processor 2012 of the higher layer processor 201 performs the control related to the random access of the mobile station apparatus 1.

In the above-described processing, the radio resource controller 2011 of the higher layer processor 201 manages the downlink carrier component and uplink carrier component allocated to the mobile station apparatus 1, and various kinds of configuration data such as C-RNTI. Moreover, the radio resource controller 2011 generates the information to be arranged in each channel of each uplink carrier component, and outputs the same to the transmission processor 209 for each uplink carrier component. For example, when the radio resource for Message 3 is allocated by a random access response, the radio resource controller 2011 generates the information to be transmitted by Message 3 and outputs the same to the transmission processor 209.

Based on the downlink control information (e.g., downlink grant, uplink grant) notified by means of the physical downlink control channel from the base station apparatus 3, the uplink grant with respect to the Message 3 notified by random access, and various kinds of configuration data of the mobile station apparatus 1 managed by the radio resource controller 2011, the radio resource controller 2011 generates control information in order and controls the reception processor 205 and the transmission processor 209, and outputs the same to the controller 203.

In the above-described processing, the random access processor 2012 of the higher layer processor 201 manages: information related to random access transmission, which the base station apparatus 3 broadcasts, such as information indicative of a pair of an uplink carrier component and a downlink carrier component for transmitting/receiving some of or all of the messages, the messages being related to random access, the configuration of the physical random access channel, which the downlink carrier component corresponds to, and the transmission conditions of random access; and information indicative of the physical random access channel corresponding to a specific downlink carrier component, by means of which random access procedure can be started, notified from the base station apparatus 3. The random access processor 2012 starts random access when the mobile station apparatus 1 has received a physical downlink control channel instructing to start random access procedure from the base station apparatus 3 and when there is data information to be transmitted by means of an uplink but the uplink radio resource has not been allocated from the base station apparatus 3.

When the random access processor 2012 is instructed to start random access by means of a physical downlink control channel from the base station apparatus 3 and the number of a signature and the radio resource of the physical random access channel corresponding to a downlink carrier component are specified, the random access processor 2012 selects, among the radio resources of the physical random access channel corresponding to a specific downlink carrier component set in the base station apparatus 3, the physical random access channel and signature which are specified by the physical downlink control channel instructing to start random access procedure.

Moreover, when the number of a signature and the radio resource of a physical random access channel have not been specified by means of the physical downlink control channel instructing to start random access procedure, or when the random access processor 2012 has determined to start random access procedure, the random access processor 2012 randomly selects a radio resource among the radio resources of the physical random access channel corresponding to a specific downlink carrier component, by means of which the random access procedure can be started, set in the base station apparatus 3, and determines, from the information about the downlink channel quality and the like, a range of signatures for contention based random access to select, and then randomly selects a signature from the selected range of signatures. Thus, the mobile station apparatus 1 can perform contention based random access by means of an appropriate random access resource corresponding to a specific downlink carrier component, which the base station apparatus 3 preliminarily allocated based on the channel quality of an uplink carrier component, the transmission conditions of a physical random access channel, and the like.

The random access processor 2012 outputs control information to the controller 203 so that the preamble generator 207 generates a preamble including the selected signature, and outputs the control information to the controller 203 so that the transmission processor 209 transmits the preamble by means of the radio resource of the selected physical random access channel.

The random access processor 2012 calculates the RA-RNTI corresponding to the radio resource, by means of which the preamble has been transmitted. Moreover, the random access processor 2012 outputs control information to the controller 203 so that the reception processor 205 monitors the downlink grant including the calculated RA-RNTI in the downlink carrier component paired with the uplink carrier component, by means of which the preamble has been transmitted, during a random access response receiving period which is a predetermined period after transmitting the preamble.

When the number of a signature is specified from the base station apparatus 3, and if the number of a signature specified from the base station apparatus 3 is included in the random access response in which the downlink grant including the calculated RA-RNTI indicates the allocation of radio resources, the random access processor 2012 determines that random access is successful, and terminates the processing related to the random access procedure.

When the number of a signature has not been specified from the base station apparatus 3, the random access processor 2013 detects, from the random access response in which the downlink grant including the calculated RA-RNTI indicates the allocation of radio resources, the number of a signature included in the preamble which the mobile station apparatus 1 transmitted, and obtains a deviation amount of synchronization timing, the temporary C-RNTI, and the uplink grant indicative of the allocation of radio resources of Message 3 corresponding to the number of the detected signature. Moreover, the random access processor 2012, based on the deviation amount of synchronization timing, outputs control information to the controller 203 so as to adjust the transmission timing of the uplink signal of the transmission processor 209.

The random access processor 2012 outputs the uplink grant addressed to the mobile station apparatus 1, the uplink grant being included in the random access response, to the radio resource controller 2011. Moreover, the random access processor 2012 outputs control information to the radio resource controller 2011 so as to generate Message 3 including the C-RNTI allocated to the base station apparatus 3 or the information such as a connection request.

The random access processor 2012 monitors contention resolution in the downlink carrier component allocated to the base station apparatus 3 during a contention resolution receiving period which is a predetermined period after transmitting Message 3, and determines, if the contention resolution has been detected in the downlink carrier component, that random access is successful and terminates the processing related to the random access.

The controller 203, based on the control information from the higher layer processor 201, generates the control signals controlling the reception processor 205, the preamble generator 207, and the transmission processor 209. The controller 203 outputs the generated control signals to the reception processor 205, the preamble generator 207, and the transmission processor 209 and controls the reception processor 205, the preamble generator 207, and the transmission processor 209.

The reception processor 205, in accordance with the control signal input from the controller 203, separates, demodulate and decodes the reception signal received from the base station apparatus 3 via the receiving antenna, and outputs the decoded information to the higher layer processor 201. Moreover, the reception processor 205, based on the reception quality and the like of the detected downlink reference signal, generates channel quality information and outputs the same to the higher layer processor 201 and the transmission processor 209.

Specifically, the reception processor 205 converts (down-converts) the signal of each uplink carrier component, which has been received via each receiving antenna, into an intermediate frequency, removes an unwanted frequency component, and controls an amplification level so that the signal level is adequately maintained, and orthogonally demodulates the received signal based on the in-phase component and quadrature component of the received signal, and converts the orthogonally demodulated analog signal into a digital signal. The reception processor 205 removes the portion corresponding to a guard interval from the converted digital signal. The reception processor 205 performs Fast Fourier Transform on the signal, from which the guard interval has been removed, to extract a frequency domain signal.

The reception processor 205 separates the extracted signal for each downlink carrier component into the signals arranged in a physical downlink control channel, in a physical downlink shared channel, and in the downlink reference signal, respectively. Note that this separation is performed based on the radio resource allocation information and the like notified by downlink grant. Moreover, the reception processor 205 calculates an estimated value of a channel from the separated downlink reference signal, and performs compensation of the channels of a physical downlink control channel and a physical downlink shared channel. Moreover, the reception processor 205, based on the reception quality and the like of the separated downlink reference signal, generates channel quality information and outputs the same to the higher layer processor 201 and the transmission processor 209.

The reception processor 205 performs demodulation of the QPSK modulation scheme on a physical downlink control channel, and monitors the downlink grant and uplink grant including the C-RNTI which is allocated to the mobile station apparatus by the base station apparatus 3 and the downlink grant including the RA-RNTI corresponding to the radio resource of the physical random access channel, by means of which the mobile station apparatus transmitted the preamble, and attempts to decode. The reception processor 205, if succeeded in decoding a physical downlink control channel, outputs the decoded downlink control information to the higher layer processor 201. The reception processor 205 performs the demodulation of a modulation scheme, such as QPSK, 16QAM, or 64QAM, which is notified by downlink grant, on a physical downlink shared channel, and performs the decoding corresponding to a coding rate notified by downlink grant, and outputs the decoded data information to the higher layer processor 201.

The preamble generator 207, in accordance with the control signal input from the controller 203, generates the preamble including the signature which the random access processor 2012 has selected, and outputs the same to the transmission processor 209.

The transmission processor 209, in accordance with the control signal input from the controller 203, generates an uplink reference signal, encodes and modulates the data information input from the higher layer processor 201 and the channel quality information input from the reception processor 205, and arranges the resulting information into a physical uplink shared channel and in a physical uplink control channel, and multiplexes the same with the generated uplink reference signal and transmits the multiplexed signal to the base station apparatus 3 via the transmission antenna. Moreover, the transmission processor 209, in accordance with the control signal input from the controller 203, arranges the preamble, which is input from the preamble generator 207, into a physical random access channel and transmits the same to the base station apparatus 3 via the transmission antenna.

Specifically, the transmission processor 209, in accordance with the control signal input from the controller 203, performs encoding, such as turbo encoding, convolutional encoding, block encoding, on the uplink control information and data information of each uplink carrier component input from the higher layer processor 201 and the reception processor 205, and modulates the encoded bit with a modulation scheme, such as BPSK, QPSK, 16QAM, or 64QAM.

The transmission processor 209 generates, as an uplink reference signal, a sequence calculated by a rule which is predetermined based on a cell identifier and the like for identifying the base station apparatus 3, the sequence being known by the base station apparatus 3. The transmission processor 209 spreads the modulation symbol of a physical uplink control channel with a code, and rearranges the modulation symbols of the physical uplink shared channel in parallel, and then performs Discrete Fourier Transform (DFT) on the rearranged modulation symbols, and multiplexes the resulting modulation symbols with the generated uplink reference signal. Moreover, the transmission processor 209 arranges the preamble, which is input from the preamble generator 207, into a physical random access channel.

The transmission processor 209 performs Inverse Fast Fourier Transform on the multiplexed signal, and performs the modulation of SC-FDMA, and adds a guard interval to the SC-FDMA modulated SC-FDMA symbol and generates a baseband digital signal, converts the baseband digital signal into an analog signal, generates the in-phase component and quadrature component of an intermediate frequency from the analog signal, removes the redundant frequency components with respect to the intermediate frequency band, converts (up-converts) an intermediate frequency signal into a high frequency signal, removes the redundant frequency components, power-amplifies the resulting high frequency signal, and outputs the amplified signal to the transmission antenna for transmission.

Figure 8:
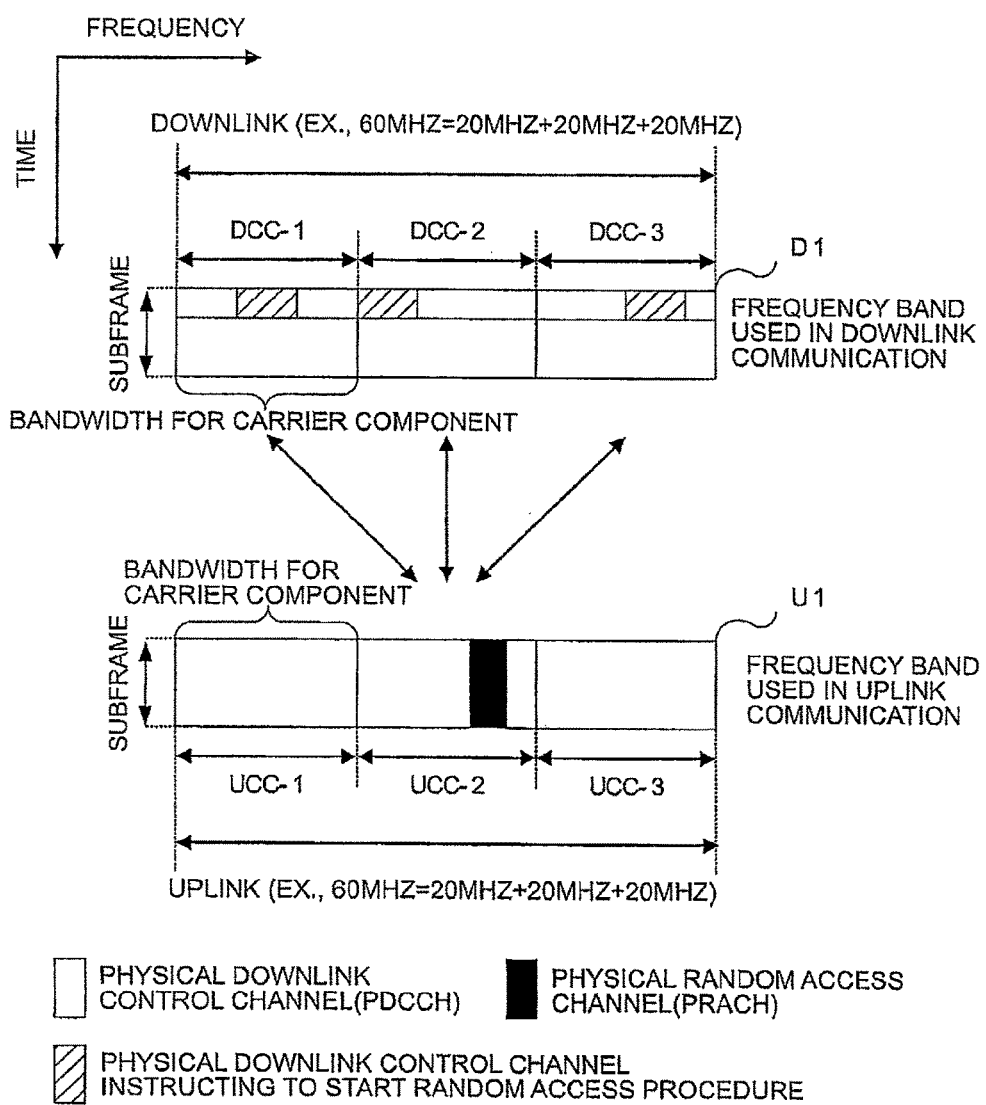
FIG. 8 is a conceptual view showing a relationship between a physical downlink control channel and a physical random access channel according to the embodiment.

Hereinafter, the operation of a wireless communication system is described. FIG. 8 is a conceptual view showing the relationship between a physical downlink control channel and a physical random access channel according to the embodiment. FIG. 8 shows a case where the base station apparatus 3 allocates three downlink carrier components (DCC-1, DCC-2, DCC-3) and three uplink carrier components (UCC-1, UCC-2, UCC-3) to the mobile station apparatus 1 and allocates UCC-2 as the uplink carrier component which the physical downlink control channel instructing to start the physical random access channel corresponds to.

In FIG. 8, the base station apparatus 3 notifies the mobile station apparatus 1 of the physical random access channel of UCC-2, which DCC-2 corresponds to, as the physical random access channel by means of which random access procedure can be started. Moreover, the base station apparatus 3 allocates the radio resource of the physical random access channel of UCC-2 and the number of a signature to the mobile station apparatus 1, and transmits the physical downlink control channel instructing to start the random access procedure, the physical downlink control channel including the information indicative of the allocated physical random access channel and number of a signature, by means of any one downlink carrier component among the downlink carrier components (DCC-1, DCC-2, DCC-3) allocated to the mobile station apparatus 1.

Upon receipt of the physical downlink control channel instructing to start random access procedure by means of any one downlink carrier component among the downlink carrier components (DCC-1, DCC-2, DCC-3) allocated to the base station apparatus 3, the mobile station apparatus 1 transmit a preamble (Message 1) using the radio resource of a physical random access channel and the signature, which the relevant physical downlink control channel indicates, among the physical random access channels of UCC-2 notified from the base station apparatus 3.

Figure 9:
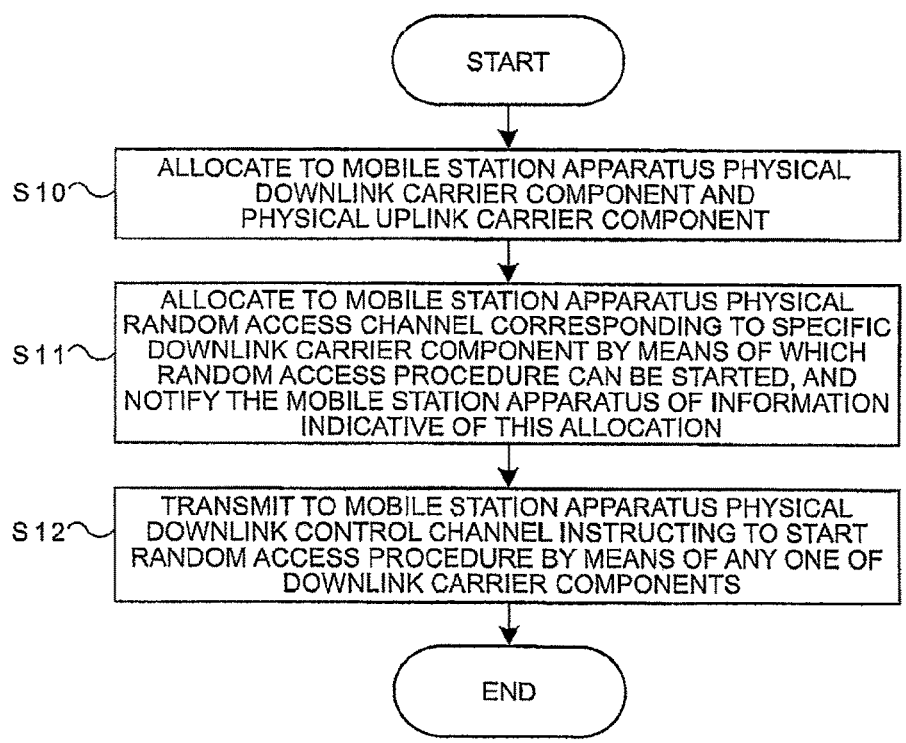
FIG. 9 is a flow diagram showing an example of the operation of the base station apparatus 3 according to the embodiment.

FIG. 9 is a flow diagram showing an example of the operation of the base station apparatus 3 according to the embodiment. The base station apparatus 3 allocates to the mobile station apparatus 1 a downlink carrier component, by means of which a physical downlink shared channel may be transmitted, and an uplink carrier component to which the radio resource of a physical uplink shared channel may be allocated (Step S10). The base station apparatus 3 allocates to the mobile station apparatus 1 physical random access channels corresponding to a specific downlink carrier component by means of which random access procedure can be started, and notifies the information indicative of this allocation to the mobile station apparatus 1 (Step S11). The base station apparatus 3 transmits the physical downlink control channel instructing to start random access procedure to the mobile station apparatus 1 by means of any one downlink carrier component (Step S12). After Step S12, the base station apparatus 3 terminates the processing related to the transmission of the physical downlink control channel instructing to start random access procedure.

Figure 10:
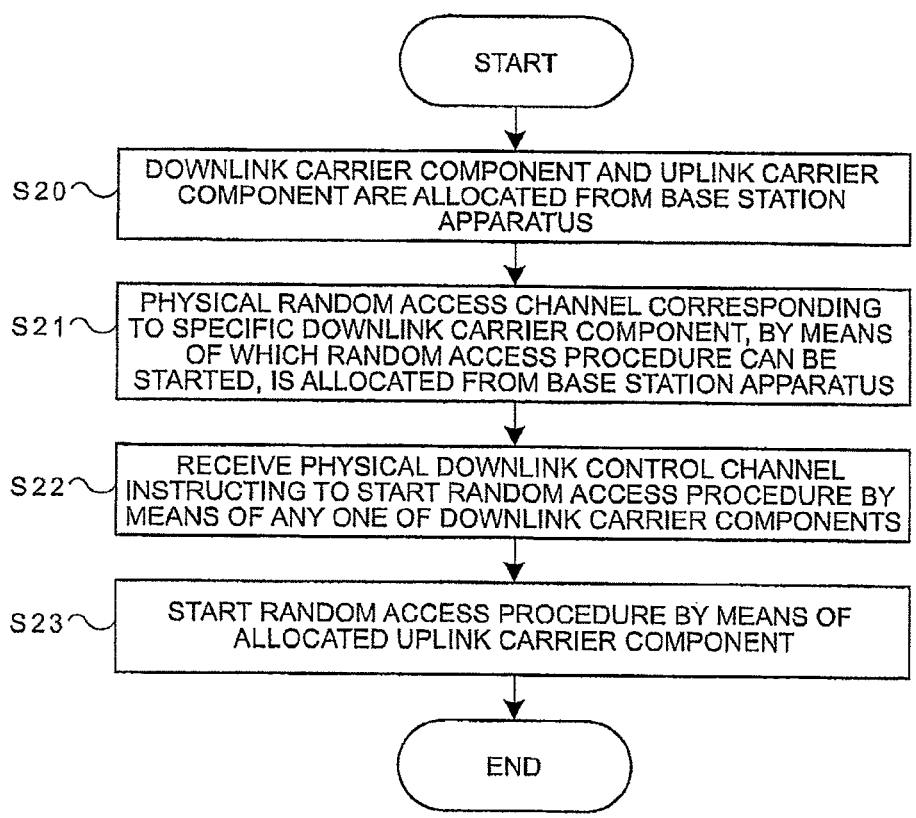
FIG. 10 is a flow diagram showing an example of the operation of the mobile station apparatus 1 according to the embodiment.

FIG. 10 is a flow diagram showing an example of the operation of the mobile station apparatus 1 according to the embodiment. The mobile station apparatus 1 is allocated, from the base station apparatus 3, a downlink carrier component to which a physical downlink shared channel may be transmitted and an uplink carrier component to which the radio resource of a physical uplink shared channel may be allocated (Step S20). The mobile station apparatus 1 is notified of the information indicative of the physical random access channels corresponding to a specific downlink carrier component, by means of which random access procedure can be started, the physical random access channels being allocated from the base station apparatus (Step S21).

The mobile station apparatus 1 receives the physical downlink control channel instructing to start random access procedure by means of any one downlink carrier component among the downlink carrier components allocated in Step S20 (Step S22). The mobile station apparatus 1 starts random access procedure by means of the physical random access channel corresponding to a specific downlink carrier component, by means of which random access procedure can be started, allocated in Step S21 (Step S23). After Step S23, the mobile station apparatus 1 terminates the processing related to the reception of the physical downlink control channel instructing to start random access procedure.

Note that, in the first embodiment of the present invention, because a downlink carrier component and an uplink carrier component, by means of which the base station apparatus 3 and the mobile station apparatus 1 transmit/receive some of or all of the messages for random access, serve as a pair, the base station apparatus 3 allocates to the mobile station apparatus 1 physical random access channels corresponding to a specific downlink carrier component, by means of which random access procedure can be started, in other words the base station apparatus 3 allocates to the mobile station apparatus 1 a downlink carrier component and an uplink carrier component, by means of which communication for random access procedure can be performed, and the base station apparatus 3 allocates to the mobile station apparatus 1 a downlink carrier component or an uplink carrier component by means of which the communications for random access procedure can be performed.

Thus, according to the first embodiment of the present invention, the wireless communication system is a wireless communication system in which the base station apparatus 3 and at least one mobile station apparatus 1 communicate with each other using a plurality of carrier components each defined by a different frequency band, wherein the base station apparatus 3 preliminarily allocates random access resources corresponding to a specific downlink carrier component, by means of which the mobile station apparatus 1 can start a random access communication, among the random access resources corresponding to the respective downlink carrier components set in the mobile station apparatus 1, and transmits a physical downlink control channel (control information) instructing to start random access procedure by means of one arbitrary downlink carrier component among a plurality of downlink carrier components set in the mobile station apparatus 1, and wherein upon receipt of the physical downlink control channel (control information) instructing to start random access procedure by means of any one downlink carrier component, the mobile station apparatus 1 starts random access procedure by means of the random access resource corresponding to a specific downlink carrier component preliminarily allocated to the base station apparatus 3.

In this manner, without changing the configuration of the physical downlink control channel instructing to start the random access procedure in the conventional art, the mobile station apparatus 1 can determine that "the physical downlink control channel instructing to start random access procedure, the physical downlink control channel being received by means of anyone downlink carrier component among a plurality of downlink carrier components allocated from the base station apparatus 3, is indicating the start of random access procedure with respect to a random access resource corresponding to a preliminarily allocated specific downlink carrier component." Moreover, the base station apparatus 3, based on the channel quality of a plurality of downlink carrier components allocated to the mobile station apparatus 1, the overhead of a physical downlink control channel, and the like, can flexibly select a downlink carrier component in which the physical downlink control channel instructing to start random access procedure is arranged.

Second Embodiment

Hereinafter, a second embodiment of the present invention will be described with reference to the accompanying drawings.

In the second embodiment of the present invention, a case is described where a base station apparatus selects, from among the radio resources of physical random access channels corresponding to a plurality of downlink carrier components allocated to a mobile station apparatus, one arbitrary physical random access channel for instructing the mobile station apparatus to start physical random access channel processing, and indicates "which downlink carrier component the selected physical random access channel corresponds to" to the mobile station apparatus by means of the downlink carrier component for transmitting a physical downlink control channel instructing to start the random access procedure.

Comparing the wireless communication system according to the embodiment with the wireless communication system according to the first embodiment, the higher layer processor of the mobile station apparatus and the higher layer processor of the base station apparatus differ between the first and second embodiments. However, because the configurations and functions which other components have are the same as those of the first embodiment, the description of the same functions as those of the first embodiment is omitted. Hereinafter, a mobile station apparatus and a base station apparatus according to the embodiment are referred to as a mobile station apparatus 5 and a base station apparatus 7, respectively.

Figure 11:
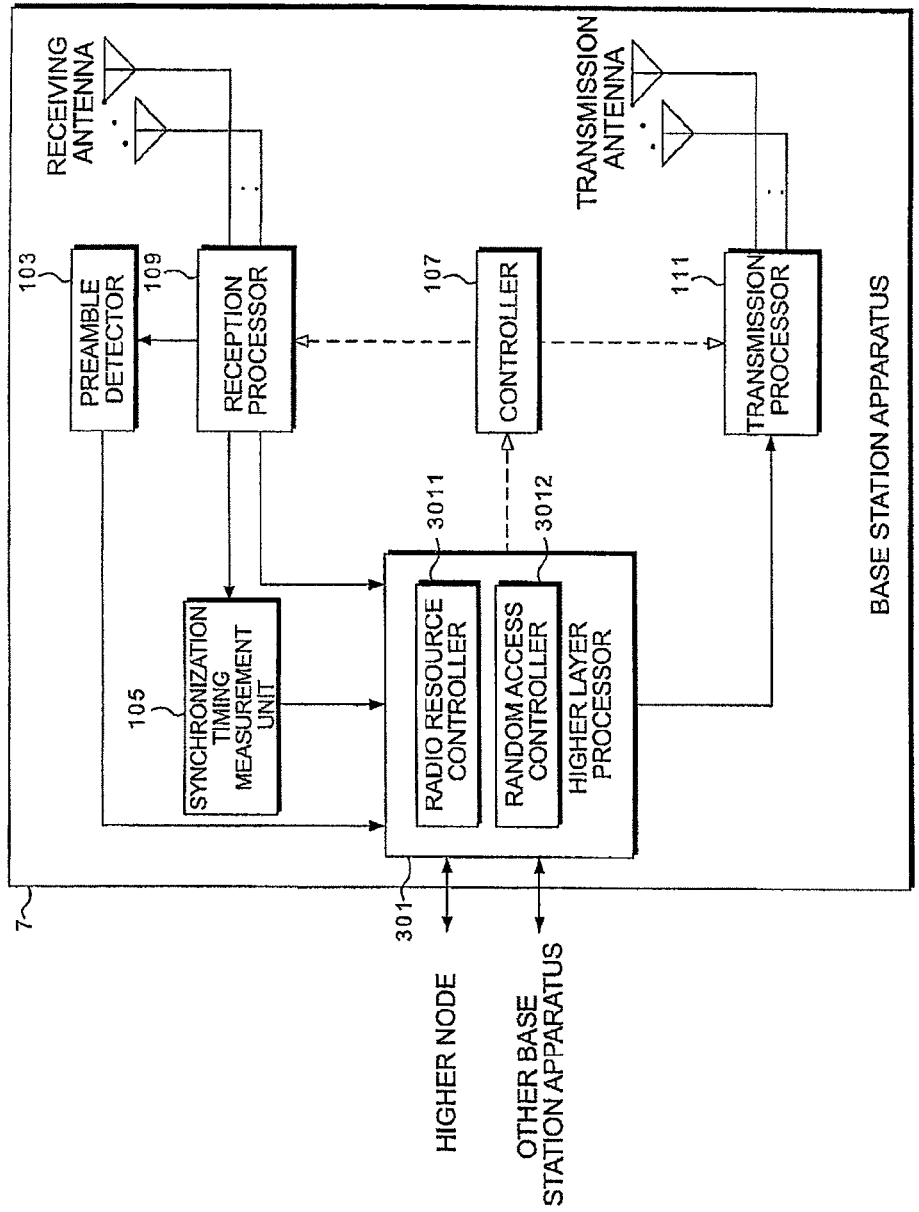
FIG. 11 is a schematic block diagram showing the configuration of a base station apparatus 7 according to a second embodiment of the present invention.

FIG. 11 is a schematic block diagram showing the configuration of the base station apparatus 7 according to the second embodiment of the present invention. Comparing a higher layer processor 301 (FIG. 11) according to the embodiment with the higher layer processor 101 (FIG. 6) according to the first embodiment, a radio resource controller 3011 and a random access controller 3012 differ.

Now, the processing of the higher layer processor 301 of the base station apparatus 7 is described. The higher layer processor 3011 outputs the data information for each downlink carrier component to the transmission processor 111. Moreover, the higher layer processor 301 performs the processing of a packet data convergence protocol layer, a radio link control layer, and a radio resource control layer. The radio resource controller 3011 of the higher layer processor 301 performs the management and the like of various kinds of configuration data, communication conditions, and buffer conditions of the respective mobile station apparatuses 5. The random access controller 3012 of the higher layer processor 301 performs the control related to random access of the respective mobile station apparatuses 5.

Comparing the radio resource controller 3011 according to the embodiment with the radio resource controller 1011 according to the first embodiment, a difference is in that the radio resource controller 3011 selects one downlink carrier component based on the control information from the random access controller 3012 and transmits a physical downlink control channel instructing to start random access procedure to the mobile station apparatus 5 via the transmission processor 111 by means of the selected downlink carrier component. Because other functions which the radio resource controller 3011 according to the embodiment has are the same as those which the radio resource controller 1011 according to the first embodiment has, the description of the same functions as those of the first embodiment is omitted.

The random access controller 3012 generates broadcast information including the information related to random access, such as information indicative of a pair of an uplink carrier component and a downlink carrier component for transmitting/receiving some of or all of the messages for random access, the configuration of a physical random access channel (the allocation and the like of radio resources of a physical random access channel), the transmission conditions (random access load) of random access, and additionally a pair of physical random access channels corresponding to a downlink carrier component for transmitting a physical downlink control channel instructing to start the random access procedure and a downlink carrier component to be instructed to start random access procedure. The random access controller 3012 then outputs control information to the radio resource controller 3011 so as to transmit the same to the mobile station apparatus 5 via the transmission processor 111.

For example, when the base station apparatus 7 and the mobile station apparatus 5 are out of synchronization while the random access controller 3012 has data information to be transmitted to the mobile station apparatus 5, the random access controller 3012 determines to instruct the mobile station apparatus 5 to start random access procedure. Moreover, the random access controller 3012, based on the transmission conditions of random access, the channel quality of the uplink carrier component, and the like, selects an uplink carrier component instructing to start random access procedure and allocates the radio resource of a physical random access channel and the signature within the selected uplink carrier component to the mobile station apparatus 5.

The random access controller 3012 generates the physical downlink control channel for instructing the mobile station apparatus 5 to start random access procedure, and outputs control information to the radio resource controller 3011 so as to transmit the relevant physical downlink control channel to the mobile station apparatus 5 via the transmission processor 111 by means of the downlink carrier component corresponding to the physical random access channel of the uplink carrier component instructing to start random access procedure.

Moreover, the random access controller 3012 according to the embodiment does not have the function which the random access controller 1012 according to the first embodiment has, i.e., the function to set to the respective mobile station apparatuses 1 a physical random access channel corresponding to a specific downlink carrier component, by means of which random access procedure can be started, based on the transmission conditions of random access, the channel quality of the uplink carrier component, and the like, generate information indicative of the set specific downlink carrier component, and include this information into a radio resource control signal and the like, and output the resulting control information to the radio resource controller 1011 so as to transmit the same to the respective mobile station apparatuses 1 via the transmission processor 111. Because other functions which the radio resource controller 3011 according to the embodiment has are the same as those which the radio resource controller 1011 according to the first embodiment has, the description of the same functions as those of the first embodiment is omitted.

Figure 12:
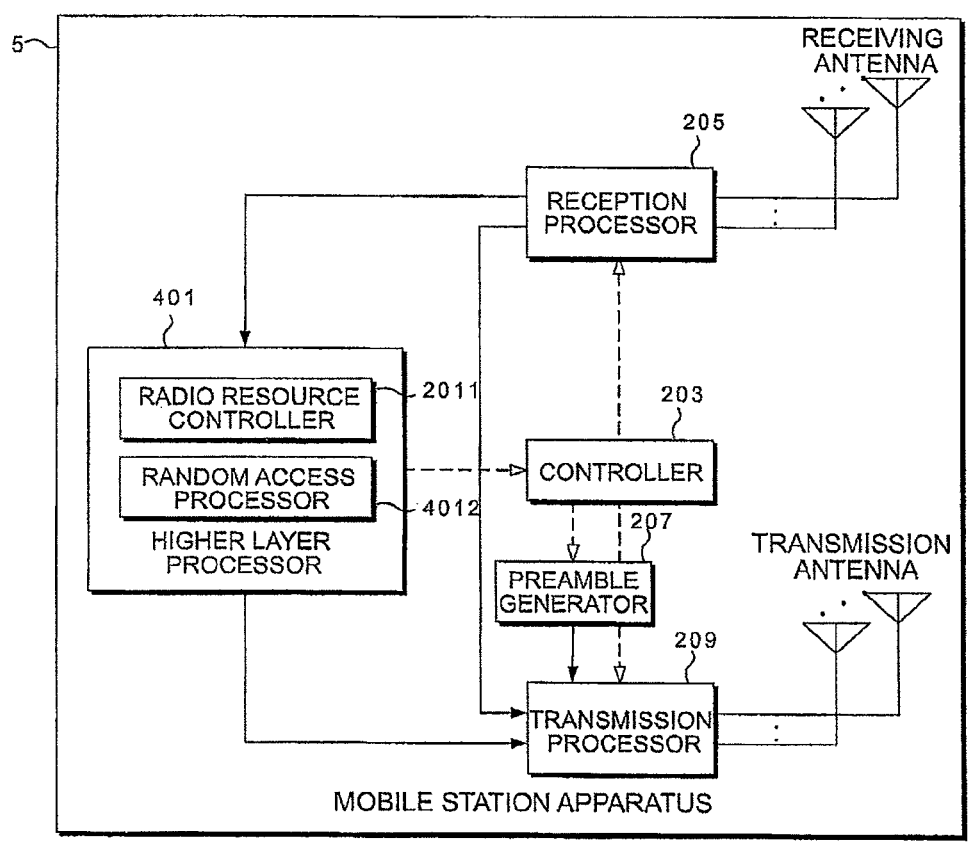
FIG. 12 is a schematic block diagram showing the configuration of a mobile station apparatus 5 according to the second embodiment of the present invention.

FIG. 12 is a schematic block diagram showing the configuration of the mobile station apparatus 5 according to the second embodiment of the present invention. Comparing an higher layer processor 401 (FIG. 12) according to the embodiment with the higher layer processor 201 (FIG. 7) according to the first embodiment, a random access processor 4012 differs.

The higher layer processor 401 outputs the data information for each uplink carrier component generated by the operation of a user or the like to the transmission processor 209. Moreover, the higher layer processor 401 performs the processing of a packet data convergence protocol layer, a radio link control layer, and a radio resource control layer. The random access processor 4012 of the higher layer processor 401 performs the control related to the random access of the mobile station apparatus 5.

In the above-described processing, when the mobile station apparatus receives a physical downlink control channel instructing to start the random access procedure from the base station apparatus 3 and when there is data information to be transmitted by means of an uplink but the uplink radio resource has not been allocated from the base station apparatus 3, the random access processor 4012 of the higher layer processor 401 starts random access procedure.

The random access processor 4012, upon receipt of a physical downlink control channel instructing to start random access procedure by any one downlink carrier component, determines that the random access processor 4012 is instructed to start the random access procedure by means of the radio resource of a physical random access channel which a downlink carrier component corresponds to, the downlink carrier component having receiving the relevant physical downlink control channel. Moreover, the random access processor 4012 selects the number of a signature specified by the relevant physical downlink control channel, and the radio resource of the physical random access channel.

When the number of a signature and the radio resource of the physical random access channel have not been specified by means of the physical downlink control channel instructing to start the random access procedure, or when the random access processor 4012 has determined to start random access procedure, the random access processor 4012 randomly selects an uplink carrier component and the radio resource of a physical random access channel within the uplink carrier component. Furthermore, the random access processor 4012 determines, from the channel quality information and the like of the downlink carrier component, a range of signatures for contention based random access to select, and randomly selects a signature from the selected range of signatures. Thus, the mobile station apparatus 5 selects the random access resource for performing contention based random access, from the random access resources corresponding to all the downlink carrier components allocated to the base station apparatus 7. Therefore, the random access resources which a plurality of mobile station apparatus 5 select are dispersed, and the probability that a plurality of mobile station apparatus 5 select the same random access resource and the same number of a signature can be reduced.

The random access processor 4012 according to the embodiment does not have the function, which the random access processor 2012 according to first embodiment has, i.e., the function to manage the information indicative of a physical random access channel corresponding to a specific downlink carrier component by means of which random access procedure can be started. Because other functions which the random access processor 4012 according to the embodiment has are the same as those which the random access processor 2012 according to the first embodiment has, the description of the same functions as those of the first embodiment is omitted.

Figure 13:
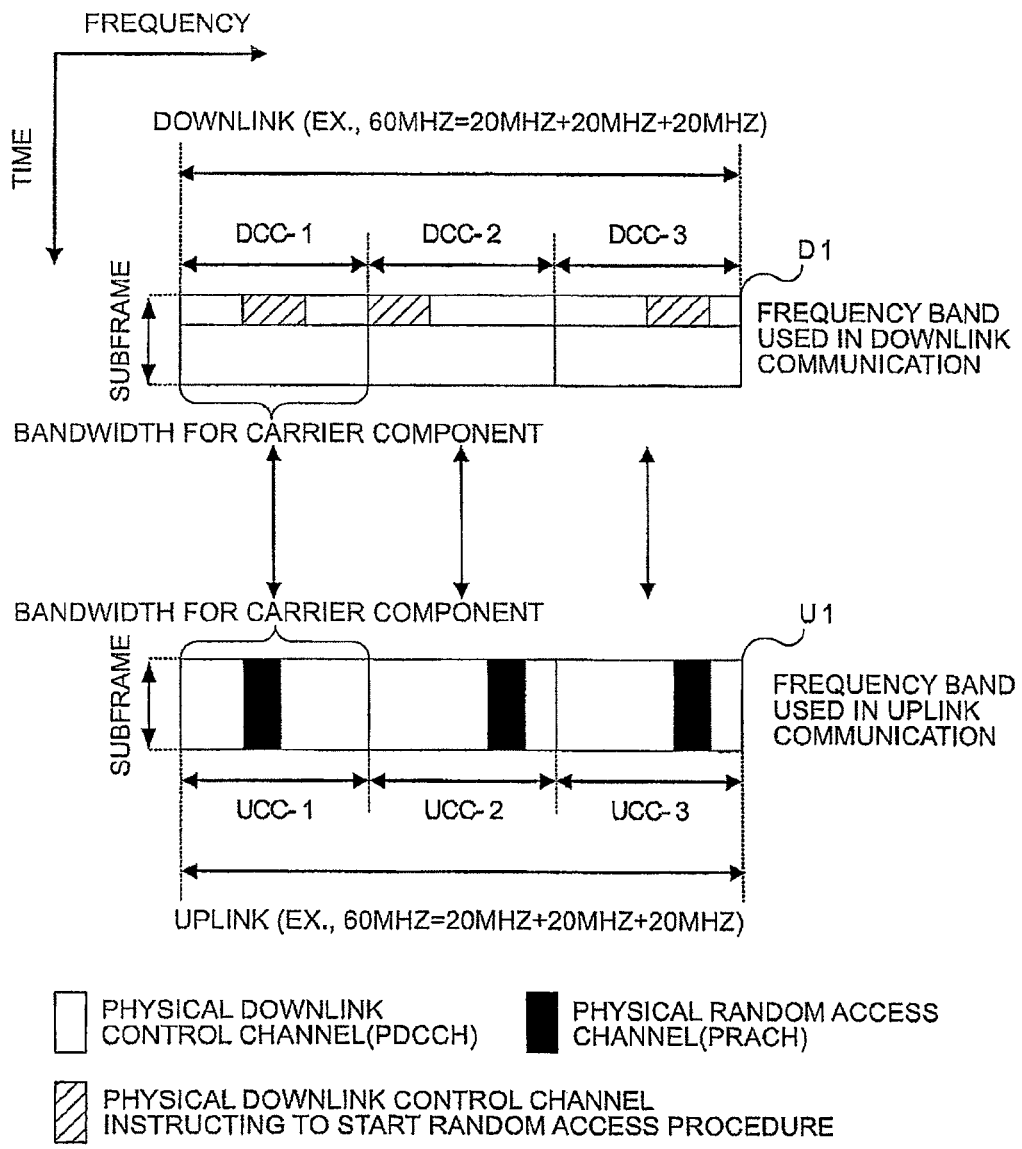
FIG. 13 is a conceptual view showing a relationship between a physical downlink control channel and a physical random access channel according to the embodiment.

Hereinafter, the operation of a wireless communication system is described. FIG. 13 is a conceptual view showing the relationship between a physical downlink control channel and a physical random access channel according to the embodiment. FIG. 13 shows a case where the base station apparatus 7 allocates three downlink carrier components (DCC-1, DCC-2, DCC-3) and three uplink carrier components (UCC-1, UCC-2, UCC-3) to the mobile station apparatus 5, and notifies that DCC-1 and UCC-1, DCC-2 and UCC-2, DCC-3 and UCC3 each are pairs as the pair of a downlink carrier component for transmitting a physical downlink control channel instructing to start the random access procedure and an uplink carrier component including a physical random access channel to be instructed to start random access procedure.

In FIG. 13, the base station apparatus 7 allocates the radio resource of a physical random access channel and the number of a signature of UCC1, UCC-2, or UCC-3 to the mobile station apparatus 5, and transmits a physical downlink control channel instructing to start the random access procedure by means of the downlink carrier component (DCC-1, DCC-2, DCC-3) which the radio resource of the physical random access channel allocated to the mobile station apparatus 5 corresponds to.

Upon receipt of the physical downlink control channel instructing to start the random access procedure by means of any one downlink carrier component among the downlink carrier components (DCC-1, DCC-2, DCC-3) allocated to the base station apparatus 7, the mobile station apparatus 5 selects a physical random access channel corresponding to the downlink carrier component (DCC-1, DCC-2, DCC-3) having received the relevant physical downlink control channel, and transmits the preamble (Message 1) using the radio resource and signature of the physical random access channel which the relevant physical downlink control channel indicates by means of the selected uplink carrier component.

Figure 14:
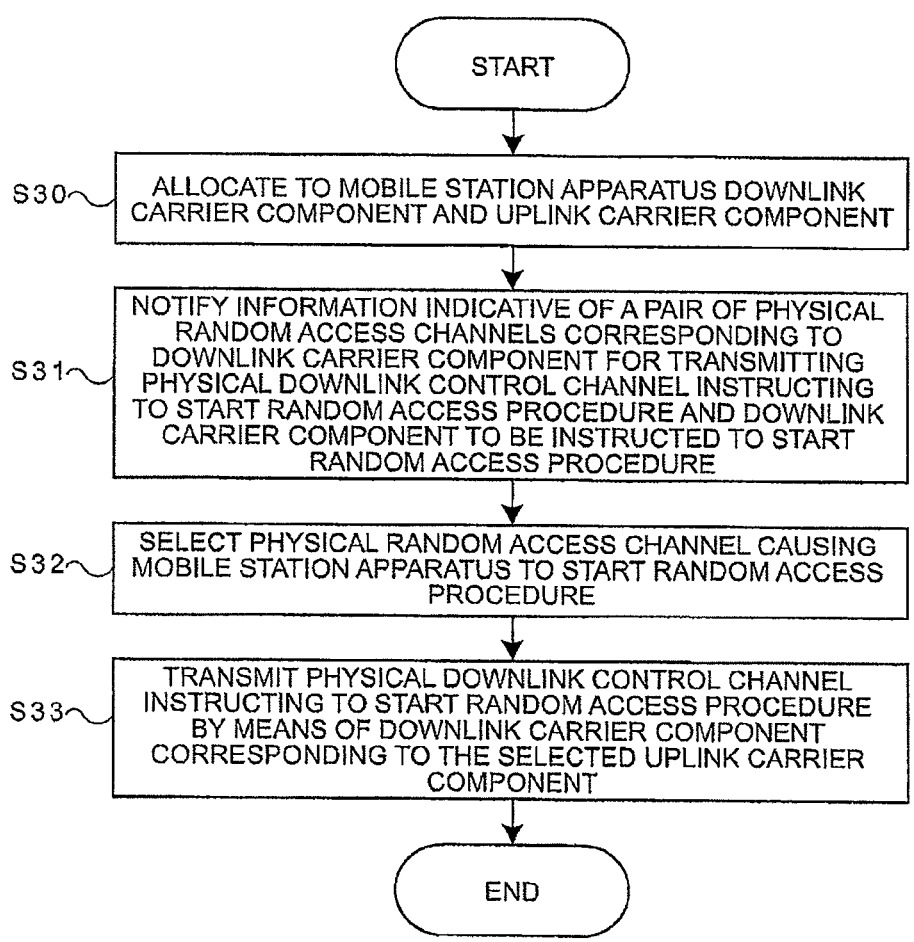
FIG. 14 is a flow diagram showing an example of the operation of the base station apparatus 7 according to the embodiment.

FIG. 14 is a flow diagram showing an example of the operation of the base station apparatus 7 according to the embodiment. The base station apparatus 7 allocates to the mobile station apparatus 5 a downlink carrier component by means of which a physical downlink shared channel may be transmitted, and an uplink carrier component to which the radio resource of a physical uplink shared channel may be allocated (Step S30). The base station apparatus 7 notifies the mobile station apparatus 5 of the information indicative of a pair of physical random access channels corresponding to a downlink carrier component for transmitting a physical downlink control channel instructing to start the random access procedure and a downlink carrier component to be instructed to start random access procedure (Step 31).

The base station apparatus 7 selects a physical random access channel causing the mobile station apparatus 5 to start random access procedure (Step S32). The base station apparatus 7 transmits to the mobile station apparatus 5 a physical downlink control channel instructing to start the random access procedure by means of the downlink carrier component corresponding to the physical random access channel selected in Step S32 (Step S33). After Step S33, the base station apparatus 7 terminates the processing related to the transmission of the physical downlink control channel instructing to start the random access procedure.

Figure 15:
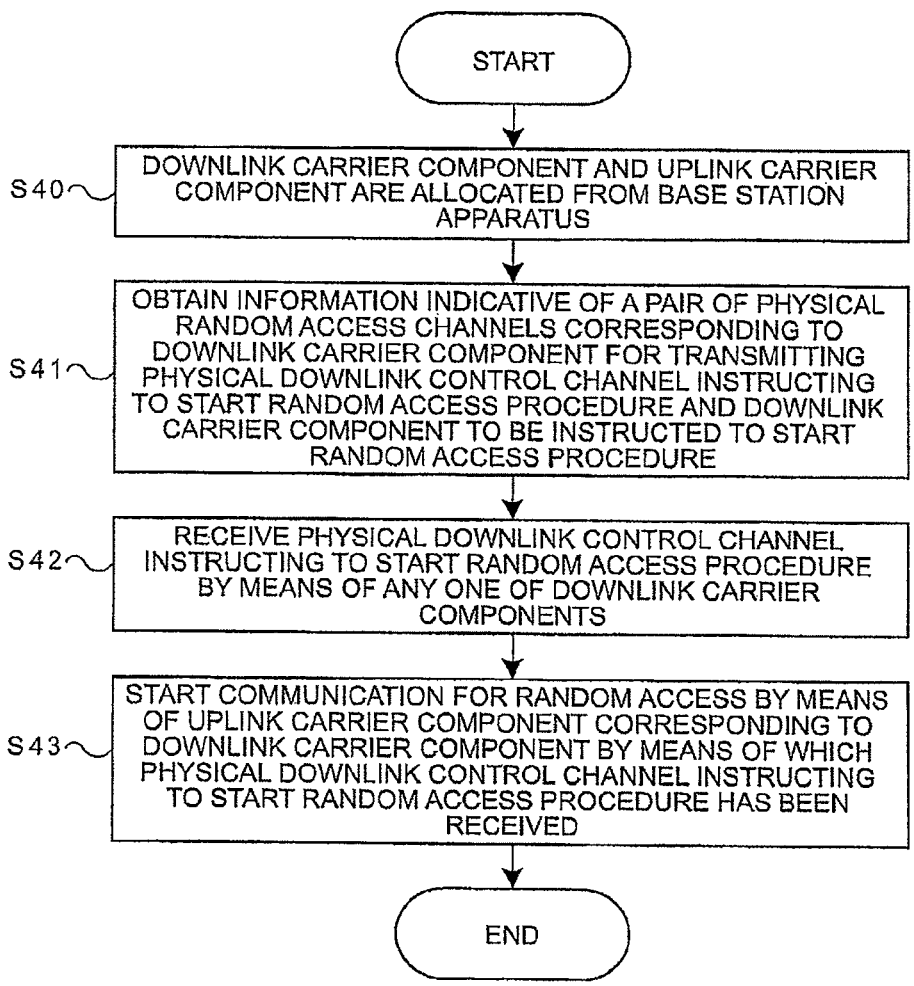
FIG. 15 is a flow diagram showing an example of the operation of the mobile station apparatus 5 according to the embodiment.
Figure 16:
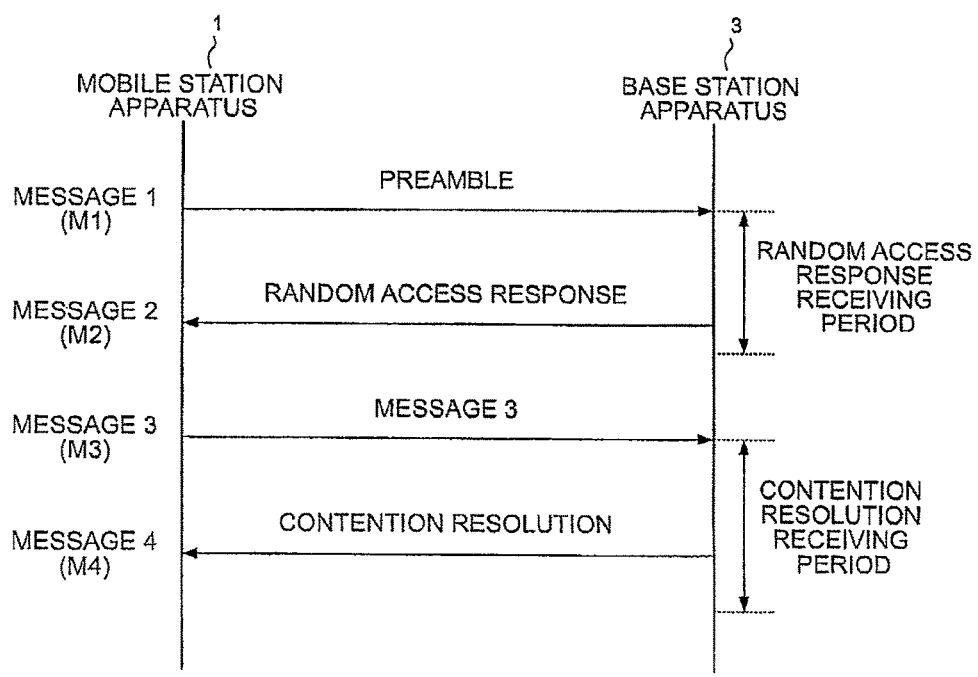
FIG. 16 is a view showing an example of the procedure of contention based random access according to a conventional art.
Figure 17:
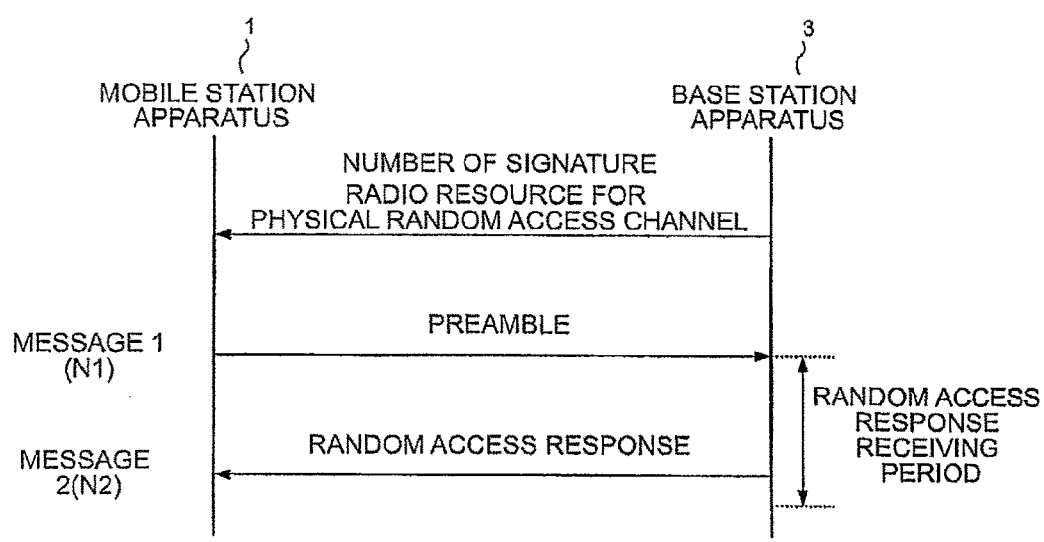
FIG. 17 is a view showing an example of the procedure of non-contention based random access according to the conventional art.

FIG. 15 is a flow diagram showing an example of the operation of the mobile station apparatus 5 according to the embodiment. The mobile station apparatus 5 is allocated, from the base station apparatus 7, a downlink carrier component to which a physical downlink shared channel may be transmitted and an uplink carrier component to which the radio resource of a physical uplink shared channel may be allocated (Step S40). The mobile station apparatus 5 obtains, from the base station apparatus 7, the information indicative of a pair of physical random access channels corresponding to a downlink carrier component for transmitting a physical downlink control channel instructing to start the random access procedure and a downlink carrier component to be instructed to start random access procedure (Step S41).

The mobile station apparatus 5 receives the physical downlink control channel instructing to start the random access procedure by means of any one downlink carrier component among the downlink carrier components allocated in Step S40 (Step S42). Upon receipt of the physical downlink control channel instructing to start the random access procedure, the mobile station apparatus 5 determines, in accordance with the information obtained in Step S41, that the mobile station apparatus 5 is instructed to start the random access procedure in the physical random access channel corresponding to a downlink carrier component, by means of which the relevant physical downlink control channel has been received, and starts the random access procedure by means of the relevant physical random access channel (Step S43). After Step S43, the mobile station apparatus 5 terminates the processing related to the reception of the physical downlink control channel instructing to start the random access procedure.

Note that, in the second embodiment of the present invention, the base station apparatus 7 transmits information indicative of a pair of an uplink carrier component and a downlink carrier component for transmitting/receiving some of or all of the messages, and information indicative of a pair of physical random access channels corresponding to a downlink carrier component for transmitting a physical downlink control channel instructing to start the random access procedure and a downlink carrier component to be instructed to start random access procedure. However, the pair of an uplink carrier component and a downlink carrier component for transmitting/receiving some of or all of the messages may be set the same as the pair of physical random access channels corresponding to a downlink carrier component for transmitting a physical downlink control channel instructing to start random access procedure, and a downlink carrier component to be instructed to start random access procedure. Thus, the mobile station apparatus 5, upon receipt of a physical downlink control channel instructing to start the random access procedure by means of any one downlink carrier component, may determine that the mobile station apparatus 5 is instructed to start random access procedure by means of the physical random access channel corresponding to the relevant downlink carrier component, so that the amount of information which the base station apparatus 7 broadcasts can be reduced.

Thus, according to the second embodiment of the present invention, the wireless communication system is a wireless communication system in which the base station apparatus 7 and at least one mobile station apparatus 5 communicate with each other using a plurality of carrier components each defined by a different frequency band, wherein the base station apparatus 7 selects, among the random access resources corresponding to the respective downlink component carrier components set in the mobile station apparatus 5, a random access resource causing the mobile station apparatus 5 to start a random access communication, and transmits a physical downlink control channel (control information) instructing to start random access procedure by means of a downlink component carrier component corresponding to the selected random access resource, and wherein the mobile station apparatus 5, upon receipt of a physical downlink control channel (control information) instructing to start random access procedure by means of any one downlink carrier component, starts random access procedure by means of the random access resource corresponding to a downlink carrier component having received the relevant physical downlink control channel (control information).

Thus, without changing the configuration of the physical downlink control channel instructing to start the random access procedure in the conventional art, the mobile station apparatus 5, depending on by means of which downlink carrier component among a plurality of downlink carrier components allocated from the base station apparatus 7, the physical downlink control channel instructing to start random access procedure has been received, can determine that "the relevant physical downlink control channel is currently instructing to start random access procedure with respect to a random access resource corresponding to which downlink carrier component." Moreover, the base station apparatus 7, based on the channel quality of a plurality of uplink carrier components allocated to the mobile station apparatus 5, the transmission conditions (random access load) of the physical random access channel, and the like, can flexibly select the uplink carrier component instructing to start the random access procedure.

Note that, in the first embodiment and second embodiment of the present invention, each downlink carrier component corresponds to the physical random access channel within a different uplink carrier component, but a plurality of downlink carrier components may correspond to different physical random access channels within the same uplink carrier component, or a plurality of downlink carrier components may correspond to the same physical random access channel within the same uplink carrier component. In this case, information indicative of the uplink carrier component paired with a downlink carrier component, the information being included in information related to random access transmission of a plurality of downlink carrier components, or the configuration of a physical random access channel which the downlink carrier component corresponds to becomes the same between the first and second embodiments (A) In addition, the present invention may employ the following forms. That is, the wireless communication system of the present invention is a wireless communication system in which the base station apparatus and at least one mobile station apparatus communicate with each other using a plurality of carrier components each defined by a different frequency band, wherein the base station apparatus comprises: a random access controller which, among the random access resources corresponding to the respective downlink carrier components set in the mobile station apparatus 1, preliminarily allocates a random access resource corresponding to a specific downlink carrier component by means of which the mobile station apparatus 1 can start a random access communication; and a transmission processor which transmits control information instructing to start the random access procedure by means of one arbitrary downlink carrier component among a plurality of downlink carrier components set in the mobile station apparatus 1, and wherein the mobile station apparatus further comprises a random access processor which, upon receipt of the control information instructing to start random access procedure by means of anyone downlink carrier component, starts random access procedure by means of the random access resource corresponding to a specific downlink carrier component preliminarily allocated to the base station apparatus.

In this manner, a base station apparatus preliminarily notifies to a mobile station that the physical downlink control channel instructing to start the random access procedure instructs the start of random access procedure with respect to the random access resource corresponding to which downlink carrier component. Therefore, the mobile station apparatus can determine that a physical downlink control channel instructing to start the random access procedure, which is received by any one downlink carrier component among a plurality of downlink carrier components allocated from the base station apparatus, is currently instructing the start of random access procedure with respect to a random access resource corresponding to a preliminarily allocated specific downlink carrier component. Moreover, the base station apparatus, based on the channel quality of a plurality of downlink carrier components allocated to the mobile station apparatus, the overhead of a physical downlink control channel, or the like, can flexibly select a downlink carrier component in which a physical downlink control channel instructing to start the random access procedure is arranged.

(B) The radio communication of the present invention is a wireless communication system in which the base station apparatus and at least one mobile station apparatus communicate with each other using a plurality of carrier components each defined by a different frequency band, wherein the base station apparatus comprises a random access controller which, from among the random access resources corresponding to the respective downlink carrier components set in the mobile station apparatus, selects a random access resource causing the mobile station apparatus to start a random access communication; and a transmission processor which transmits control information instructing to start random access procedure by means of a downlink carrier component corresponding to the selected random access resource, and wherein the mobile station apparatus further comprises a random access processor which, upon receipt of the control information instructing to start random access procedure by means of any one downlink carrier component, starts random access procedure by means of a random access resource corresponding to the downlink carrier component having received the control information.

In this manner, a base station apparatus notifies the physical downlink control channel instructing to start the random access procedure to a mobile station apparatus by using a downlink carrier component which a random access resource corresponds to, the random access resource by means of which the relevant physical downlink control channel instructs to start random access procedure. Therefore, the mobile station apparatus, depending on by means of which downlink carrier component among a plurality of downlink carrier components allocated from the base station apparatus, the physical downlink control channel instructing to start the random access procedure has been received, can determine that "the relevant physical downlink control channel is currently instructing to start random access procedure with respect to the random access resource corresponding to which downlink carrier component." Moreover, the base station apparatus, based on the channel quality of a plurality of uplink carrier components allocated to the mobile station apparatus, the transmission conditions (random access load) of the physical random access channel, and the like, can flexibly select the uplink carrier component instructing to start the random access procedure.

(C) In the wireless communication system of the present invention, the base station apparatus and the mobile station apparatus communicate messages for random access by means of an uplink carrier component including the random access resource, which the base station apparatus selected, and a downlink carrier component corresponding to the uplink carrier component.

With this configuration, the amount of information which a base station apparatus broadcasts to a mobile station apparatus can be reduced.

(D) In the wireless communication system of the present invention, the base station apparatus transmits a radio resource control signal including information indicative of a specific random access resource allocated to the mobile station apparatus.

In this manner, a base station apparatus notifies a random access resource preliminarily allocated to a mobile station apparatus, the random access resource corresponding to a specific downlink carrier component which the physical downlink control channel instructing to start the random access procedure corresponds to. Therefore, the mobile station apparatus can determine that "a physical downlink control channel instructing to start the random access procedure, the physical downlink control channel being received by means of any one downlink carrier component among a plurality of downlink carrier components allocated from the base station apparatus, is instructing to start random access procedure with respect to a random access resource corresponding to a preliminarily allocated specific downlink carrier component."

(E) In the wireless communication system of the present invention, the physical downlink control channel instructing to start the random access procedure further includes, among the random access resources corresponding to the downlink carrier component, information indicative of a random access resource, by means of which the mobile station apparatus can start random access procedure, and information indicative of a signature.

With this configuration, the base station apparatus, depending on the transmission conditions of random access and the like, can notify the random access resource, which is allocated among the random access resources corresponding to a downlink carrier component, and the number of a signature to a mobile station apparatus by using a physical downlink control channel instructing to start the random access procedure.

(F) In the wireless communication system of the present invention, the random access controller, when specifying contention based random access as a random access method for the mobile station apparatus, sets the information indicative of a signature to a specific code point, and the random access processor, when the information indicative of a signature is the specific code point, selects contention based random access as the random access method.

With this configuration, the base station apparatus can, for example when there is no signature for non-contention based random access to be allocated to a mobile station apparatus, instruct a mobile station apparatus to select contention based random access as the random access method, using a physical downlink control channel instructing to start the random access procedure.

(G) In the wireless communication system of the present invention, the random access processor, when contention based random access has been selected as the random access method, selects a random access resource for starting random access procedure among the random access resources corresponding to a specific downlink carrier component preliminarily allocated to the base station apparatus.

With this configuration, the mobile station apparatus can perform contention based random access by means of an appropriate random access resource corresponding to a specific downlink carrier component, which the base station apparatus preliminarily allocated based on the channel quality of an uplink carrier component, the transmission conditions of a physical random access channel, and the like.

(H) In the wireless communication system of the present invention, the random access processor, when contention based random access has been selected as the random access method, selects a random access resource for starting random access procedure among all the random access resources corresponding to the respective downlink carrier components set in the base station apparatus.

With this configuration, a mobile station apparatus selects a random access resource for performing contention based random access among the random access resources corresponding to all the downlink carrier components allocated to a base station apparatus. Therefore, the random access resources which a plurality of mobile station apparatuses select are dispersed, and the probability that a plurality of mobile station apparatuses select the same random access resource and the same number of a signature can be reduced.

(I) The base station apparatus of the present invention is a base station apparatus applied to a wireless communication system in which the base station apparatus and at least one mobile station apparatus communicate with each other using a plurality of carrier components each defined by a different frequency band, wherein the base station apparatus comprises: a random access controller which, among the random access resources corresponding to the respective downlink carrier components set in the mobile station apparatus, preliminarily allocates a random access resource by means of which the mobile station apparatus can start a random access communication, and a transmission processor which transmits control information instructing to start the random access procedure by means of one arbitrary downlink carrier component among a plurality of downlink carrier components set in the mobile station apparatus 1.

Thus, a base station apparatus preliminarily notifies to a mobile station that the physical downlink control channel instructing to start the random access procedure instructs the start of random access procedure with respect to the random access resource corresponding to which downlink carrier component. Therefore, the mobile station apparatus can determine that "a physical downlink control channel instructing to start the random access procedure, the physical downlink control channel being received by means of any one downlink carrier component among a plurality of downlink carrier components allocated from the base station apparatus, is currently instructing to start random access procedure with respect to a random access resource corresponding to a preliminarily allocated specific downlink carrier component." Moreover, the base station apparatus, based on the channel quality of a plurality of downlink carrier components allocated to the mobile station apparatus, the overhead of a physical downlink control channel, or the like, can flexibly select a downlink carrier component in which a physical downlink control channel instructing to start the random access procedure is arranged.

(J) The base station apparatus of the present invention is a base station apparatus applied to a wireless communication system in which the base station apparatus and at least one mobile station apparatus communicate with each other using a plurality of carrier components each defined by a different frequency band, wherein the base station apparatus comprises: a random access controller which, among the random access resources corresponding to the respective downlink carrier components set in the mobile station apparatus, selects a random access resource causing the mobile station apparatus to start a random access communication; and a transmission processor which transmits control information instructing to start random access procedure by means of a downlink carrier component corresponding to the selected random access resource.

In this manner, a base station apparatus notifies the physical downlink control channel instructing to start the random access procedure to a mobile station apparatus by using a downlink carrier component which a random access resource corresponds to, the random access resource by means of which the relevant physical downlink control channel instructs to start random access procedure. Therefore, the mobile station apparatus, depending on by means of which downlink carrier component among a plurality of downlink carrier components allocated from the base station apparatus, the physical downlink control channel instructing to start the random access procedure has been received, can determine that "the relevant physical downlink control channel is currently instructing to start random access procedure with respect to the random access resource corresponding to which downlink carrier component." Moreover, the base station apparatus, based on the channel quality of a plurality of uplink carrier components allocated to the mobile station apparatus, the transmission conditions (random access load) of the physical random access channel, and the like, can flexibly select the uplink carrier component instructing to start the random access procedure.

(K) The mobile station apparatus of the present invention is a mobile station apparatus applied to a wireless communication system in which the base station apparatus and at least one mobile station apparatus communicate with each other using a plurality of carrier components each defined by a different frequency band, wherein the mobile station apparatus comprises a random access processor which, upon receipt of the control information instructing to start random access procedure by means of any one downlink carrier component, starts random access procedure by means of the random access resource corresponding to a specific downlink carrier component preliminarily allocated to the base station apparatus.

Thus, the mobile station apparatus determines that "a physical downlink control channel instructing to start the random access procedure, the physical downlink control channel being received by means of any one downlink carrier component among a plurality of downlink carrier components allocated from the base station apparatus, is currently instructing to start random access procedure with respect to a random access resource corresponding to a preliminarily allocated specific downlink carrier component." Therefore, the base station apparatus, based on the channel quality of a plurality of downlink carrier components allocated to the mobile station apparatus, the overhead of a physical downlink control channel, or the like, can flexibly select a downlink carrier component in which a physical downlink control channel instructing to start the random access procedure is arranged.

(L) The mobile station apparatus of the present invention is a mobile station apparatus applied to a wireless communication system in which the base station apparatus and at least one mobile station apparatus communicate with each other using a plurality of carrier components each defined by a different frequency band, wherein the mobile station apparatus comprises a random access processor which, upon receipt of the control information instructing to start random access procedure by means of any one downlink carrier component, starts random access procedure by means of a random access resource corresponding to the downlink carrier component by means of which the control information has been received.

Thus, the mobile station apparatus, depending on by means of which downlink carrier component among a plurality of downlink carrier components allocated from the base station apparatus, the physical downlink control channel instructing to start the random access procedure has been received, determines that "the relevant physical downlink control channel is currently instructing to start random access procedure with respect to the random access resource corresponding to which downlink carrier component." Therefore, the base station apparatus, based on the channel quality of a plurality of uplink carrier components allocated to the mobile station apparatus, the transmission conditions (random access load) of the physical random access channel, and the like, can flexibly select the uplink carrier component instructing to start the random access procedure.

(M) The wireless communication system of the present invention is a wireless communication method, wherein a base station apparatus and at least one mobile station apparatus perform a random access procedure using a plurality of carrier components each defined by a different frequency band, the method comprising the steps of: among random access resources corresponding to the respective downlink carrier components set in the mobile station apparatus, preliminarily allocating a specific random access resource by means of which the mobile station apparatus can start a random access communication; and transmitting control information instructing to start random access procedure by means of one arbitrary downlink carrier component among a plurality of downlink carrier components set in the mobile station apparatus.

Thus, a base station apparatus preliminarily notifies to a mobile station that "the physical downlink control channel instructing to start the random access procedure instructs the start of random access procedure with respect to the random access resource corresponding to which downlink carrier component." Therefore, the mobile station apparatus can determine that "a physical downlink control channel instructing to start the random access procedure, the physical downlink control channel being received by means of any one downlink carrier component among a plurality of downlink carrier components allocated from the base station apparatus, is currently instructing to start random access procedure with respect to a random access resource corresponding to a preliminarily allocated specific downlink carrier component." Moreover, the base station apparatus, based on the channel quality of a plurality of downlink carrier components allocated to the mobile station apparatus, the overhead of a physical downlink control channel, or the like, can flexibly select a downlink carrier component in which a physical downlink control channel instructing to start the random access procedure is arranged.

(N) The wireless communication system of the present invention is a wireless communication method, wherein a base station apparatus and at least one mobile station apparatus perform a random access procedure using a plurality of carrier components each defined by a different frequency band, the method comprising the steps of: selecting, among random access resources corresponding to the respective downlink carrier components set in the mobile station apparatus, a random access resource causing the mobile station apparatus to start a random access communication; and transmitting control information instructing to start random access procedure by means of a downlink carrier component corresponding to the selected random access resource.

In this manner, a base station apparatus notifies the physical downlink control channel instructing to start the random access procedure to a mobile station apparatus by using a downlink carrier component which a random access resource corresponds to, the random access resource by means of which the relevant physical downlink control channel instructs to start random access procedure. Therefore, the mobile station apparatus, depending on by means of which downlink carrier component among a plurality of downlink carrier components allocated from the base station apparatus, the physical downlink control channel instructing to start the random access procedure has been received, can determine that "the relevant physical downlink control channel is currently instructing to start random access procedure with respect to the random access resource corresponding to which downlink carrier component." Moreover, the base station apparatus, based on the channel quality of a plurality of uplink carrier components allocated to the mobile station apparatus, the transmission conditions (random access load) of the physical random access channel, and the like, can flexibly select the uplink carrier component instructing to start the random access procedure.

(O) The wireless communication system of the present invention is a wireless communication method, wherein a base station apparatus and at least one mobile station apparatus perform a random access procedure using a plurality of carrier components each defined by a different frequency band, the method comprising the step of: upon receipt of the control information instructing to start random access procedure by means of any one downlink carrier component, starting random access procedure by means of a random access resource corresponding to a specific downlink carrier component preliminarily allocated to the base station apparatus.

In this manner, the mobile station apparatus determines that "a physical downlink control channel instructing to start the random access procedure, which is received by means of any one downlink carrier component of a plurality of downlink carrier components allocated from the base station apparatus, is instruction to start random access procedure with respect to a random access resource corresponding to a preliminarily allocated specific downlink carrier component." Therefore, the base station apparatus, based on the channel quality of a plurality of downlink carrier components allocated to the mobile station apparatus, the overhead of a physical downlink control channel, or the like, can flexibly select a downlink carrier component in which a physical downlink control channel instructing to start the random access procedure is arranged.

(P) The wireless communication system of the present invention is a wireless communication method, wherein a base station apparatus and at least one mobile station apparatus perform a random access procedure using a plurality of carrier components each defined by a different frequency band, the method comprising the step of: upon receipt of the control information instructing to start random access procedure by means of any one downlink carrier component, starting random access procedure by means of a random access resource corresponding to the downlink carrier component, by means of which the control information is received.

In this manner, the mobile station apparatus, depending on by means of which downlink carrier component among a plurality of downlink carrier components allocated from the base station apparatus, the physical downlink control channel instructing to start the random access procedure has been received, determines that "the relevant physical downlink control channel is currently instructing to start random access procedure with respect to the random access resource corresponding to which downlink carrier component." Therefore, the base station apparatus, based on the channel quality of a plurality of uplink carrier components allocated to the mobile station apparatus, the transmission conditions (random access load) of the physical random access channel, and the like, can flexibly select the uplink carrier component instructing to start the random access procedure.

A program operating in the base station apparatuses 3, 7 and the mobile station apparatuses 1, 5 according to the present invention may be a program (program making a computer function) which controls a CPU (Central Processor) and the like so as to realize the functions of the above-described embodiments according to the present invention. Then, the information handled by these devices is temporarily stored in an RAM (Random Access Memory) during processing of the information, and the information is subsequently stored in various ROMs, such as a Flash ROM (Read Only Memory), or an HDD (Hard Disk Drive), and is read, modified, or rewritten by the CPU, as required.

Note that, some of or all of the mobile station apparatuses 1, 5 and the base station apparatuses 3, 7 in the above-described embodiments may be realized by a computer. In this case, some of or all of the mobile station apparatuses 1, 5 and the base station apparatuses 3, 7 in the above-described embodiments may be realized by storing a program for realizing this control function onto a computer readable recording medium, and causing a computer system to read and execute the program stored on this recording medium. Note that, the term "computer system" here refers to a computer system incorporated into the mobile station apparatuses 1, 5 or the base station apparatuses 3, 7, wherein the computer system includes an OS and hardware, such as peripheral devices.

Moreover, the term "computer readable recording medium" refers to a portable medium, such as a flexible disk, a magnetic optical disk, a ROM, or a CD-ROM, or a storage device, such as a hard disk incorporated into a computer system. Furthermore, the "computer readable recording medium" may include those dynamically retaining a program for a short time, like communication lines when a program is transmitted via a network, such as the Internet, or via a communication line, such as a telephone line, or those retaining a program for a certain time, like a volatile memory inside a computer system then serving as a server or a client. Moreover, the above-described program may be the one for realizing some of the above-described functions, or further may be the one capable of realizing the above-described functions in combination with a program already stored on a computer system.

Some of or all of the mobile station apparatuses 1, 5 and the base station apparatuses 3, 7 in the above-described embodiments may be realized as an LSI which is typically an integrated circuit. Each functional block of the mobile station apparatuses 1, 5 and the base station apparatuses 3, 7 may be individually integrated into a chip or some of or all thereof may be integrated into a chip. Moreover, the integration approach is not limited to an LSI, but the integration may be realized by an application specific circuit or a general-purpose processor. Moreover, if an integration technology replacing the LSI would have emerged due to an advancement in the semiconductor technologies, an integrated circuit by means of this technique may be used.

As described above, one embodiment of the present invention has been described in detail With reference to the accompanying drawings, but a specific configuration is not limited to the above-described one, and various kinds of design changes and the like can be made without departing from the scope of the present invention.

REFERENCE SIGNS LIST

1, 1A-1C, 5: mobile station apparatus
3, 7: base station apparatus
101, 301: higher layer processor
103: preamble detector
105: synchronization timing measurement unit
107: controller
109: reception processor
111: transmission processor
201, 401: higher layer processor
203: controller
205: reception processor
207: preamble generator
209: transmission processor
1011, 3011: radio resource controller
1012, 3012: random access controller
2011: radio resource controller
2012, 4012: random access processor

The invention claimed is:
1. A mobile station apparatus configured to communicate with a base station apparatus using a plurality of downlink carriers and a plurality of uplink carriers, the mobile station apparatus comprising:
reception circuitry configured to receive a PDCCH (physical downlink control channel) on a first downlink carrier of the plurality of downlink carriers, the PDCCH including first information to be used for the mobile station apparatus to select a random access preamble, a random access procedure being initiated based on or in response to the PDCCH;

selection circuitry configured to, in a case that the first information is equal to 0,
select a group of random access preambles, and
randomly select a first random access preamble within the group of random access preambles; and
transmission circuitry configured to transmit the first random random access preamble on a first uplink carrier of the plurality of uplink carriers,
wherein the reception circuitry is configured to receive a random access response corresponding to the first random access preamble, on a second downlink carrier of the plurality of downlink carriers,
the second downlink carrier is different from the first downlink carrier, and
the first uplink carrier is linked to the first downlink carrier and the second downlink carrier.

2. The mobile station apparatus according to claim 1, wherein
the PDCCH further includes second information to be used for the mobile station apparatus to determine a physical random access channel resource, and
the mobile station apparatus further comprises:
determination circuitry configured to, based on the second information, determine a first physical random access channel resource in the first uplink carrier,
the transmission unit is configured to transmit the first random access preamble using the first physical random access channel resource, and
the second downlink carrier corresponds to the first physical random access channel resource.

3. A base station apparatus configured to communicate with a mobile station apparatus using a plurality of downlink carriers and a plurality of uplink carriers, the base station apparatus comprising:
transmission circuitry configured to transmit a PDCCH (physical downlink control channel) on a first downlink carrier of the plurality of downlink carriers, the PDCCH including first information to be used for the mobile station apparatus to select a random access preamble, a random access procedure being initiated based on or in response to the PDCCH by the mobile station apparatus; and
reception circuitry configured to receive a first random access preamble on a first uplink carrier of the plurality of uplink carriers,
wherein in a case that the first information is equal to 0, the first random access preamble is randomly selected by the mobile station apparatus from a group of random access preambles, the group of random access preambles being selected by the mobile station apparatus,
the transmission circuitry is configured to transmit a random access response corresponding to the first random access preamble on a second downlink carrier of the plurality of downlink carriers, the second downlink carrier is different from the first downlink carrier, and
the first uplink carrier is linked to the first downlink carrier and the second downlink carrier.

4. The base station apparatus according to claim 3, wherein
the PDCCH further includes second information to be used for the mobile station apparatus to determine a physical random access channel resource, and
the reception circuitry is configured to receive the first random access preamble using a first physical random access channel resource in the first uplink carrier,
the first physical random access channel resource is determined by the mobile station apparatus based on the second information, and
the second downlink carrier corresponds to the first physical random access channel resource.

5. A wireless communication method for a mobile station apparatus configured to communicate with a base station apparatus using a plurality of downlink carriers and a plurality of uplink carriers, the wireless communication method comprising:
receiving a PDCCH (physical downlink control channel) on a first downlink carrier of the plurality of downlink carriers, the PDCCH including first information to be used for the mobile station apparatus to select a random access preamble, a random access procedure being initiated based on or in response to the PDCCH;
in a case that the first information is equal to 0, selecting a group of random access preambles, and randomly selecting a first random access preamble within the group of random access preambles;
transmitting the first random access preamble on a first uplink carrier of the plurality of uplink carriers; and
receiving a random access response corresponding to the first random access preamble, on a second downlink carrier of the plurality of downlink carriers,
wherein the second downlink carrier is different from the first downlink carrier, and
the first uplink carrier is linked to the first downlink carrier and the second downlink carrier.

6. The wireless communication method according to claim 5, wherein
the PDCCH further includes second information to be used for the mobile station apparatus to determine a physical random access channel resource, and
the wireless communication method further comprises:
determining, based on the second information, a first physical random access channel resource in the first uplink carrier,
transmitting the random access preamble comprises transmitting the first random access preamble using the first physical random access channel resource, and
the second downlink carrier corresponds to the first physical random access channel resource.

7. A wireless communication method for a base station apparatus configured to communicate with a mobile station apparatus using a plurality of downlink carriers and a plurality of uplink carriers, the wireless communication method comprising:
transmitting a PDCCH (physical downlink control channel) on a first downlink carrier of the plurality of downlink carriers, the PDCCH including first information to be used for the mobile station apparatus to select a random access preamble, a random access procedure being initiated based on or in response to the PDCCH by the mobile station apparatus; and
receiving a first random access preamble on a first uplink carrier of the plurality of uplink carriers;
wherein in a case that the first information is equal to 0, the first random access preamble is randomly selected by the mobile station apparatus from a group of random access preambles, the group of random access preambles being selected by the mobile station apparatus,
the wireless communication method further comprises:
transmitting a random access response corresponding to the first random access preamble on a second downlink carrier of the plurality of downlink carriers, the second downlink carrier is different from the first downlink carrier, and the first uplink carrier is linked to the first downlink carrier and the second downlink carrier.

8. The wireless communication method according to claim 7, wherein the PDCCH further includes second information to be used for the mobile station apparatus to determine a physical random access channel resource, receiving the first random access preamble comprises receiving the first random access preamble using a first physical random access channel resource in the first uplink carrier, first physical random access channel resource is determined by the mobile station apparatus based on the second information, and the second downlink carrier corresponds to the first physical random access channel resource.

* * * * *